(12) United States Patent
Nayak et al.

(10) Patent No.: US 12,349,194 B2
(45) Date of Patent: Jul. 1, 2025

(54) MULTI-AP ASSOCIATION ON NSTR LINKS

(71) Applicant: Samsung Electronics Co., Ltd., Suwon-si (KR)

(72) Inventors: Peshal Nayak, Plano, TX (US); Vishnu Vardhan Ratnam, Plano, TX (US); Ahmed Atef Ibrahim Ibrahim, Plano, TX (US); Boon Loong Ng, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/817,973

(22) Filed: Aug. 5, 2022

(65) Prior Publication Data

US 2023/0073868 A1    Mar. 9, 2023

Related U.S. Application Data

(60) Provisional application No. 63/242,314, filed on Sep. 9, 2021, provisional application No. 63/235,491, filed on Aug. 20, 2021.

(51) Int. Cl.
*H04W 4/00* (2018.01)
*H04W 52/02* (2009.01)
(Continued)

(52) U.S. Cl.
CPC ... *H04W 74/0816* (2013.01); *H04W 52/0216* (2013.01); *H04W 88/06* (2013.01); *H04W 88/10* (2013.01)

(58) Field of Classification Search
CPC ......... H04W 74/0816; H04W 52/0216; H04W 88/06; H04W 88/10; H04W 84/12;
(Continued)

(56) References Cited

U.S. PATENT DOCUMENTS

2021/0127420 A1    4/2021  Lu et al.
2021/0195540 A1    6/2021  Fischer
(Continued)

OTHER PUBLICATIONS

Extended European Search Report issued Jun. 12, 2024 regarding Application No. 22858685.5, 9 pages.
(Continued)

*Primary Examiner* — Phuongchau Ba Nguyen

(57) ABSTRACT

Methods and apparatuses for facilitating multi-AP association on NSTR links. A method for wireless communication performed by a non-access point (AP) multi-band device (MBD), wherein the non-AP MBD comprises wireless stations (STAs), the method comprising: identifying, while a first STA of the STAs is associated with a first AP, that a second STA of the STAs is either associated or to be associated with a second AP; detecting a non-simultaneous transmit and receive (NSTR) condition; when the second STA is to be associated with the second AP, determining whether an association procedure to associate the second STA with the second AP is to be initiated based on a first MBD transmission procedure; and when the second STA is associated with the second AP, generating an indication to initiate a second MBD transmission procedure.

18 Claims, 14 Drawing Sheets

(51) Int. Cl.
*H04W 74/0816* (2024.01)
*H04W 88/06* (2009.01)
*H04W 88/10* (2009.01)

(58) Field of Classification Search
CPC . H04W 72/0453; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 2021/0250963 A1 | 8/2021 | Seok et al. | |
| 2022/0312506 A1* | 9/2022 | Xia | H04W 74/0891 |
| 2023/0023779 A1* | 1/2023 | Shafin | H04W 16/14 |
| 2023/0040910 A1* | 2/2023 | Hwang | H04W 74/0808 |
| 2023/0156795 A1* | 5/2023 | Hwang | H04W 74/0816 |
| | | | 370/329 |
| 2023/0224814 A1* | 7/2023 | Kim | H04W 52/0216 |
| | | | 370/311 |
| 2023/0345362 A1* | 10/2023 | Kim | H04W 52/0216 |
| 2024/0040634 A1* | 2/2024 | Kim | H04W 48/14 |

OTHER PUBLICATIONS

Fischer, "CR NSTR limited", doc.: IEEE 802.11-21/1258r0, Aug. 2021, 12 pages.
Fischer, "CR 10.3.2.9 CTS procedure NSTR limited", doc.: IEEE 802.11-21/0671r2, 13 pages.
International Search Report and Written Opinion issued Nov. 15, 2022 regarding International Application No. PCT/KR2022/012084, 7 pages.
Fischer, "CR 10.3.2.9 CTS procedure NSTR limited", doc.: IEEE 802.11-21/0671r2, Jun. 2021, 13 pages.
LAN/MAN Standards Committee of the IEEE Computer Society; IEEE P802.11be/D1.01; Draft Standard for Information technology—Telecommunications and information exchange between systems Local and metropolitan area networks—Specific requirements; "Part 11: Wireless LAN Medium Access Control (MAC) and Physical Layer (PHY) Specifications"; "Amendment 8: Enhancements for extremely high throughput (EHT)"; Jun. 2021; 657 pgs.
IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

* cited by examiner (a) Non-AP MBD operating in a MLD mode (b) Non-AP MBD operating in a legacy mode

MULTI-AP ASSOCIATION ON NSTR LINKS

CROSS-REFERENCE TO RELATED APPLICATION(S) AND CLAIM OF PRIORITY

This application claims priority under 35 U.S.C. § 119(e) to U.S. Provisional Patent Application No. 63/235,491 filed on Aug. 20, 2021, and U.S. Provisional Patent Application No. 63/242,314 filed on Sep. 9, 2021, which are hereby incorporated by reference in their entirety.

TECHNICAL FIELD

This disclosure relates generally to multi-AP association on NSTR links.

BACKGROUND

WiFi communications has multiple eligible frequency bands of operation including the 2.4 GHz, 5 GHz and the 6 GHz bands. Next generation WiFi devices may have hardware capable of operating on multiple such bands simultaneously. In fact, IEEE 802.11be defines a new entity called multi-link device (MLD) for such multi-band operation in a coordinated way. Enabling the simultaneous association of such a WiFi device to non-co-located access points (APs) on the different bands is beneficial for improving the system performance and efficiency. However, owing to the small frequency separation of these bands, self-interference among the different bands/links at the device may be significant. For example, for a WiFi device operating on both 5 GHz and 6 GHz links, transmission on the 6 GHz link may compromise simultaneous reception on a 5 GHz link due to the out-of-band interference/leakage and vice versa. In the context of MLDs, such links are referred to as a non-simultaneous transmit/receive (NSTR) link pair. This causes two main problems. Firstly, if a device is transmitting on one link and the second link is in reception mode, the signal leakage can result in an interference to the ongoing reception on the second link. Secondly, if one a device is transmitting on one link, it may become incapable of sensing the channel occupancy on the second link (due to the interference) to determine if the channel is idle or not. Furthermore, such a limitation of self-interference between two links can be dynamic and change with time. For example, the interference can be changed depending on the channel of operation on the two links, transmit power level, temperature or device configuration. To overcome the problems arising from such time-varying self-interference, the transmission and reception on both links at a device may need to be coordinated in some way when the self-interference arises, since otherwise it can compromise the reliability of data communication on both links.

SUMMARY

Embodiments of the present disclosure provide methods and apparatuses for multi-AP association on NSTR links.

In one embodiment, a non-access point (AP) multi-band device (MBD) is provided. The non-AP MBD comprises: stations (STAs), each comprising a transceiver configured to form a link with a corresponding AP, wherein respective links operate on different frequency bands. The non-AP MBD further comprises a processor operably coupled to the STAs, the processor configured to: identify, while a first STA of the STAs is associated with a first AP, that a second STA of the STAs is either associated or to be associated with a second AP; detect a non-simultaneous transmit and receive (NSTR) condition; when the second STA is to be associated with the second AP, determine whether an association procedure to associate the second STA with the second AP is to be initiated based on a first MBD transmission procedure; and when the second STA is associated with the second AP, generate an indication to initiate a second MBD transmission procedure.

In another embodiment, a method for wireless communication performed by a non-AP MBD is provided, wherein the non-AP MBD comprises wireless stations (STAs), the method comprising: identifying, while a first STA of the STAs is associated with a first AP, that a second STA of the STAs is either associated or to be associated with a second AP; detecting a non-simultaneous transmit and receive (NSTR) condition; when the second STA is to be associated with the second AP, determining whether an association procedure to associate the second STA with the second AP is to be initiated based on a first MBD transmission procedure; and when the second STA is associated with the second AP, generating an indication to initiate a second MBD transmission procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated into the present disclosure as if fully set forth herein:

[1] IEEE P802.11be/D1.0—Draft Standard for Information technology—Telecommunications and information exchange between systems Local and metropolitan area networks—Specific requirements—Part 11: Wireless LAN Medium Access Control (MAC) and Physical Layer (PHY) Specifications—Amendment 8: Enhancements for extremely high throughput (EHT).

[2] IEEE 802.11-2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
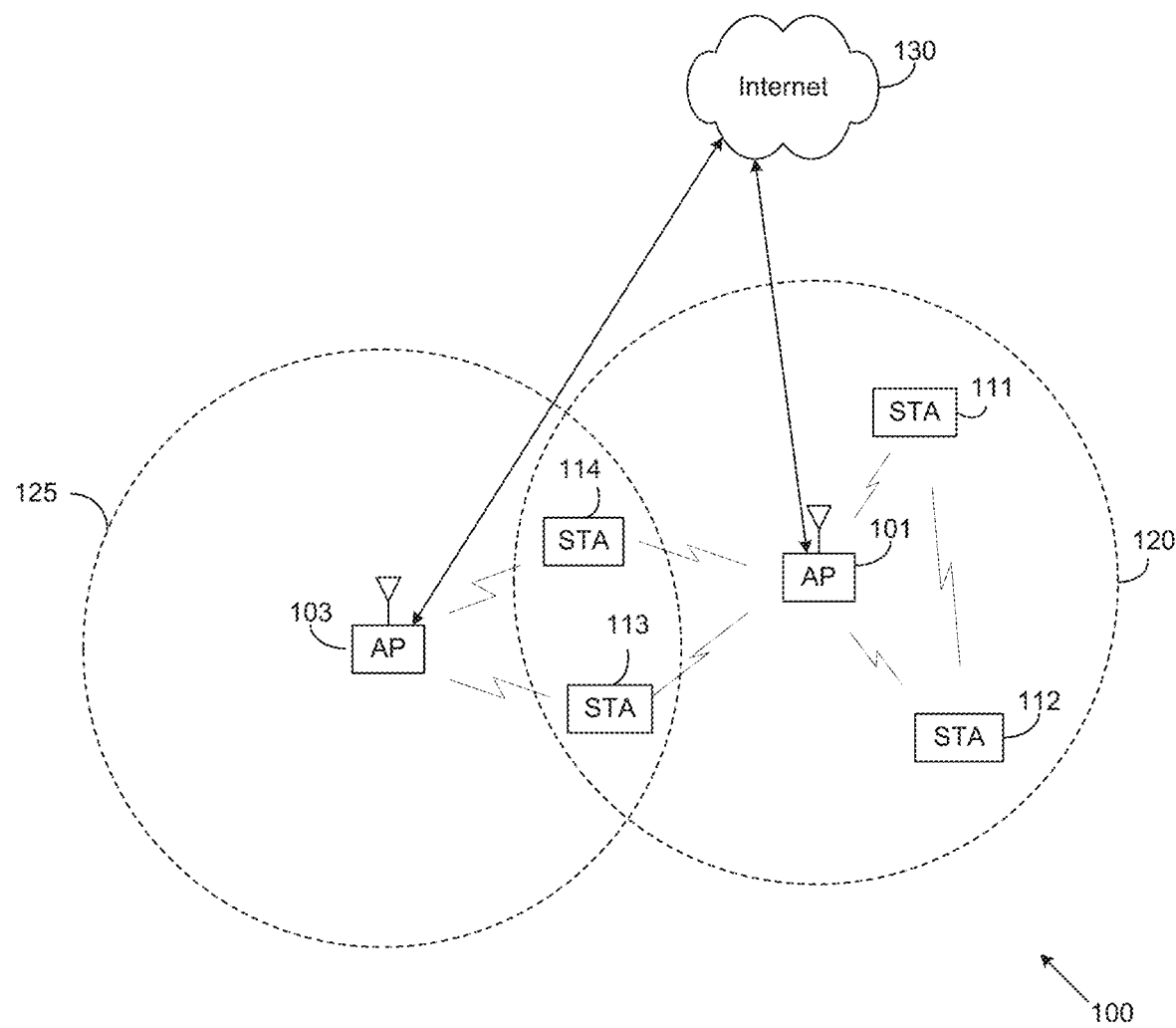
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating multi-AP association on NSTR links. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
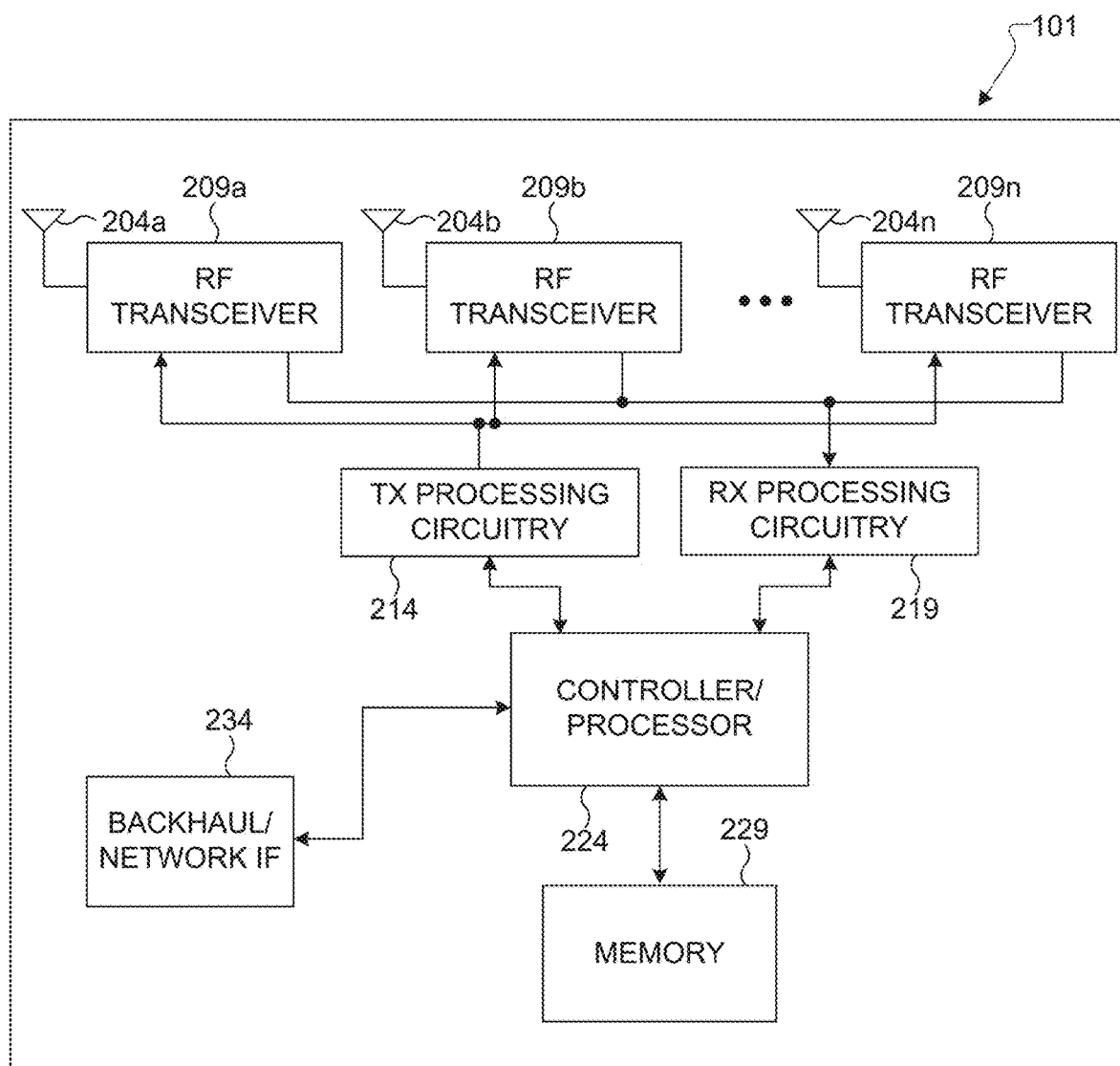
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating multi-AP association on NSTR links. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating multi-AP association on NSTR links. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
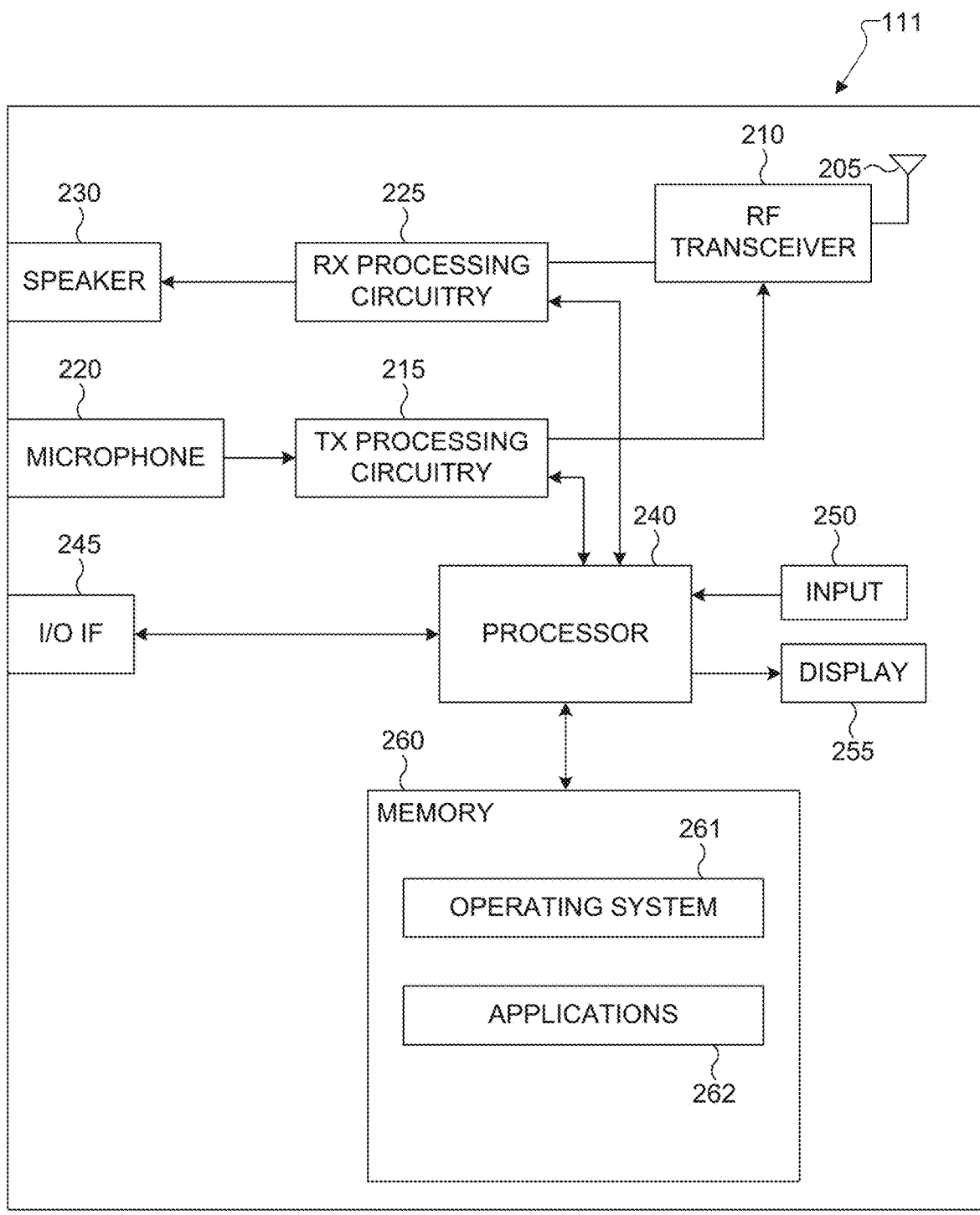
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate multi-AP association on NSTR links. In some embodiments, the controller/processor 240 includes at least one microprocessor or microcontroller.

The controller/processor 240 is also capable of executing other processes and programs resident in the memory 260, such as operations for facilitating multi-AP association on NSTR links. The controller/processor 240 can move data into or out of the memory 260 as required by an executing process. In some embodiments, the controller/processor 240 is configured to execute a plurality of applications 262, such as applications for detect interference from a neighboring BSS and inform the associated AP of the interference. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
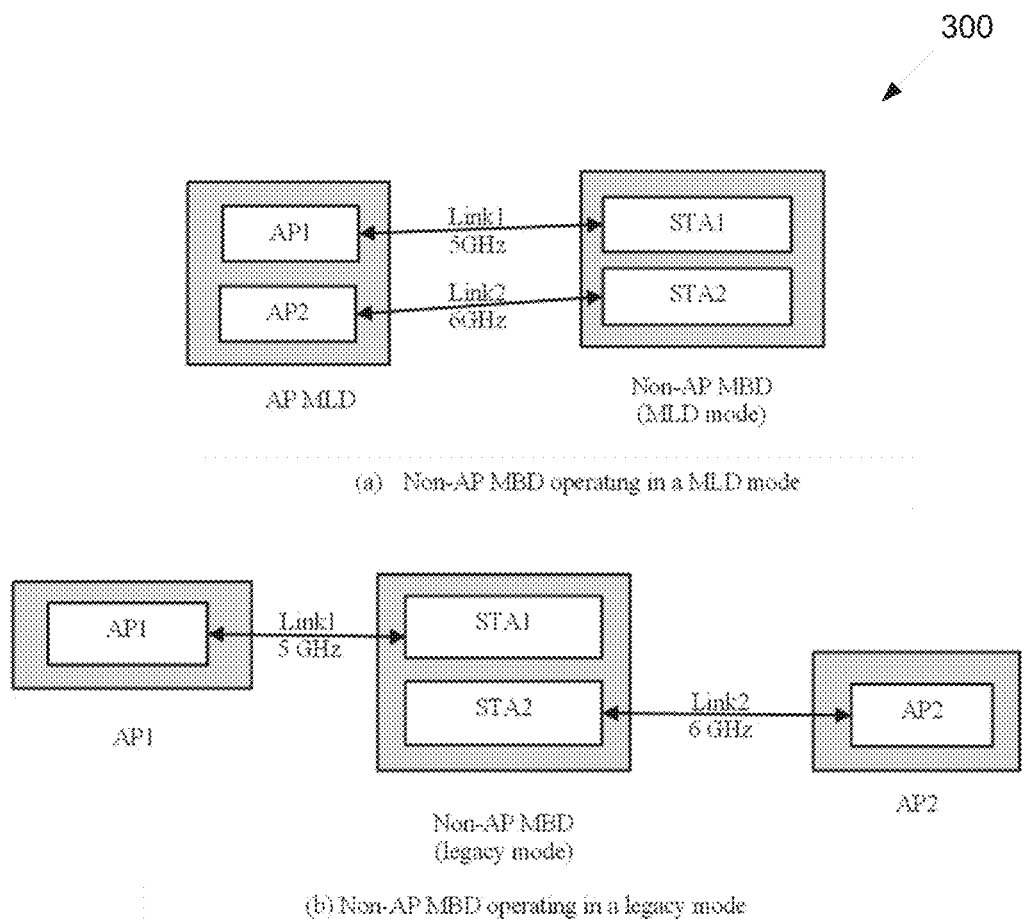
FIG. 3 illustrates an example of a multi-band device with different types of AP association according to various embodiments of this disclosure.

FIG. 3 illustrates an example of a multi-band device with different types of AP association 300 according to various embodiments of this disclosure. The embodiment of the multi-band device with different types of AP association 300 in FIG. 3 is for illustration only. Other embodiments of the multi-band device with different types of AP association 300 could be used without departing from the scope of this disclosure.

A non-AP WiFi device can be equipped with multiple stations (STAs) each capable of operating on a different frequency band simultaneously. In this disclosure, we shall refer to such a device as multi-band device (MBD). An example of such a MBD device is illustrated in FIG. 3, which has two STAs (STA1 and STA2) operating on the 5 GHz and 6 GHz bands, respectively. Such a device can have two modes of operation. In mode 1, the device operates as a non-AP MLD (as defined in 802.11be [2]) and is connected to co-located APs that also form an AP MLD. In mode 2, the device may connect to different non co-located APs on each band/link and the corresponding STAs operate as two separate STAs on each band. In this disclosure the focus is on operation in mode 2 where the STAs of the device are connected to distinct APs that are not co-located and do not form an AP MLD. An example of this scenario can be when there are two APs: AP1 and AP2 available in the vicinity of the non-AP device that operate on 5 GHz and 6 GHz respectively, but there is no AP MLD that operates on both bands. We also assume that the communication on the two links may face an out-of-band self-interference issue at the device side, referred to here as non-simultaneous transmit and receive (NSTR) operation. We further consider that such an NSTR constraint can be either permanent, or can be temporary and change with at a slow time-scale due to a channel switch on one link/band, change in transmit power, change in non-AP device configuration etc. Note that when an NSTR scenario is active, the transmission on both links can become unreliable and can compromise the system performance unless appropriate coordination is performed. When the two associated APs are not co-located, such coordination problem is further exacerbated. Current disclosure provides rules and mechanisms for non-AP device behavior when such an NSTR situation arises while under multi-AP association. We shall consider two scenarios:

1. Scenario1: NSTR condition detected at the MBD before association with AP on both links
2. Scenario2: NSTR condition detected at the MBD after association with APs on the two links In one embodiment, if a non-AP MBD has an STA1 is already associated with an AP1 on link1 and intends to transmit a probe request frame from STA2 on a channel that forms NSTR pair with link1, then the non-AP MBD may first transmit a Service Muting Notification Frame (SMNF) on link1, asking AP1 to temporarily cease transmissions to it (while retaining the AP1 association). The duration of the muting can be selected long enough to ensure successful reception of probe responses if any. In another embodiment, instead of using SMNF on link1, STA2 may align the probe request on link2 with the existing quiet elements on link1 or power-save-mode idle-state on link1 to prevent the self-interference issue.

In one embodiment, if a non-AP MBD has an STA1 that is already associated with an AP1 on link1, then it shall not initiate an association procedure from STA2 with another AP2 if:

1. The operating channel for AP2 forms an NSTR pair with the operating channel on link1, and
2. AP2 is not part of the same MLD as AP1.

However, if multiple operating channel options are available for AP2, then STA2 may still perform the association procedure on a channel that doesn't form NSTR with link1. In another scenario, if the channel for AP2 satisfies the above two conditions, STA1 may first try to negotiate a channel switch or an operating bandwidth update with AP1 to ensure that the two links no longer form an NSTR pair. If successful, then STA2 of MBD may initiate an association with AP2 on link2. In another embodiment, if a non-AP MBD has an STA1 that is already associated with an AP1 on link1, and intends to associate STA2 with another AP2 that satisfies the above two conditions, then STA1 operating on link1 can first perform a disassociation procedure and then STA2 can associate with AP2 on link2. This may be useful, for example, in scenarios where link-1 is heavily loaded and switching to link2 can enhance the achieved throughput.

In another scenario, if a non-AP MBD has an STA1 that is already associated with an AP1 on link1 and if the channel for AP2 satisfies the above two conditions, STA2 may still perform an association with AP2 with the goal of negotiating coordination of data transmission on both links such that NSTR interference is avoided. For link reliability while performing the authentication and association with AP2, STA1 may transmit an SMNF to AP1 requesting link muting on link1 for the time duration required for authentication and association handshake between STA2 and AP2. In another embodiment, STA1 may negotiate a power-save-mode with AP1 and may enter idle state before initiating the handshake between STA2 and AP2. In one embodiment, in the association request frame transmitted by STA2, non-AP MBD may include a sub-field to indicate that it has another link with a different AP1 that forms an NSTR pair with the current link. The subfield may just be a bit indication of if NSTR is present or not, or it can also include the MAC address of AP1. Such information can be utilized by AP2 to determine if it will allow association of STA2. After association on link2 is complete with AP2, the NSTR situation is identical to scenario 2 and thus may be handled via any of the embodiments described in next section.

In one embodiment, if a non-AP MBD has an STA1 associated with an AP1 on link1 and an STA2 associated with an AP2 on link2, where AP1 and AP2 are not part of the same AP MLD, and link1 and link2 have become an NSTR link pair due to change in the environment or operation conditions, the non AP MBD shall perform a disassociation procedure on either of link1 with AP1 or link2 with AP2. The determination of which link to disassociate can be based on, for example, the signal strength or RSSI from the two APs.

In another embodiment if a non-AP MBD has an STA1 associated with an AP1 on link1 and an STA2 associated with an AP2 on link2, where AP1 and AP2 are not part of the same AP MLD, and link1 and link2 have become an NSTR link pair due to change in the environment or operation conditions, the non-AP MBD may first try to negotiate coordination of data transmission on both links such that NSTR interference is avoided. For facilitating such a negotiation, in one case, STA1 of the non-AP MBD may first negotiate a power-save-mode with AP1 on link1, and go into the idle state. For facilitating such a negotiation, in another case, the non-AP MBD may first transmit a Service Muting Notification Frame (SMNF) on link1, asking AP1 to temporarily cease transmissions to it (while retaining the AP1 association). Upon receiving the SMNF, AP1 may continue to buffer the traffic for STA1 but not schedule transmissions to/from it for the duration of the muting. AP1 may also refrain from transmitting individually addressed control and management frames to STA1 for the mute duration. Broadcast and multi-cast frames may still be transmitted however. Meanwhile, the MBD shall then negotiate for coordination on link2 with AP2 reliably without facing interference from the link1. After the negotiation is successful, the non-AP MBD may transmit an updated Service Muting Notification Frame to unmute the previously muted link1. If negotiation is not successful, then SMNF may either be retransmitted to extend the muting on the previously muted link1 or the MBD may perform a disassociation with AP1 on link1. Note that here the muting of link1 and disassociation with AP1 are just exemplary, and the non-AP device can actually determine which of the links forming an NSTR pair to mute, which to perform negotiation on and which to disassociate from. In another embodiment, non-AP MLD may choose to switch the muting to the link that was not muted while negotiating coordination on the other link. This may be useful in cases where negotiating coordination is possible on one link but not possible on the other link. Before providing embodiments on the different negotiation approaches possible, we disclose next the newly proposed Service Muting Notification frame.

To enable the above, this disclosure proposes the transmission of a new management frame or action frame, called the Service Muting Notification frame (SMNF), to be transmitted by the non-AP MBD prior to muting on any associated link, with one or more of the following information elements/fields:

1. SMNF identifier: An optional ID field identifying a unique muting request.

2. Muting Action field: one bit to indicate if the SMNF frame is used for muting or unmuting
3. Start Time field: An indication of the start time of the service muting/unmuting (measured in either target beacon transmit times (TBTTs) or time units (TUs))
4. Duration field: An indication of the duration of service muting if applicable (measured in TBTTs or TUs).
5. Muting Periodicity field: An indication of the interval to the next following occurrence of service muting if periodic and applicable (measured in TBTTs or TUs)

Note that in addition to the above fields, the SMNF may also include an element ID, length, element ID extension fields.

Some of the details and operating functions of these fields are described below:

SMNF identifier field: This is an identifier unique for each mute request transmitted by an STA. In case the STA transmits a new SMNF to update or unmute an existing muting request, the same identifier field is reused to inform the AP that the SMNF is for updating or unmuting.

Muting Action field: This one bit can be 1 if SMNF is used to mute the link and can be 0 if the SMNF is used to un-mute the link to continue operation after coordinating the other link. In one embodiment, this field may not be present and instead a Duration field of zero may be used to convey an unmuting operation.

Start Time field: This field may indicate the time duration or the TBTT count to the start of the muting/unmuting operation. In an embodiment, if the SMNF is transmitted for an immediate muting due to observation of NSTR, this field may be set to a value of 0. In one embodiment, if the periodicity field is present, the SMNF may need to be transmitted by the AP at least a threshold number of TBTTs (called MinTbttToStartPeriodicMute here) ahead of the start of the service muting or unmuting.

Duration field: This field is an indication of the duration of the service muting. In one embodiment, the muting duration can a default predetermined value of TbttMuteDuration. In one embodiment, if the purpose of the SMNF is to unmute a link, this field may be set to a value of 0.

Periodicity field: This is an indication of the time duration to the next expected muting operation to be performed by the AP1 for STA1. This field may be useful in a scenario where an MBD utilizes a periodic muting to perform multi-AP coordination of transmission as shall be disclosed later. In one embodiment, this field may not be applicable to the case of unmuting.

Figure 4:
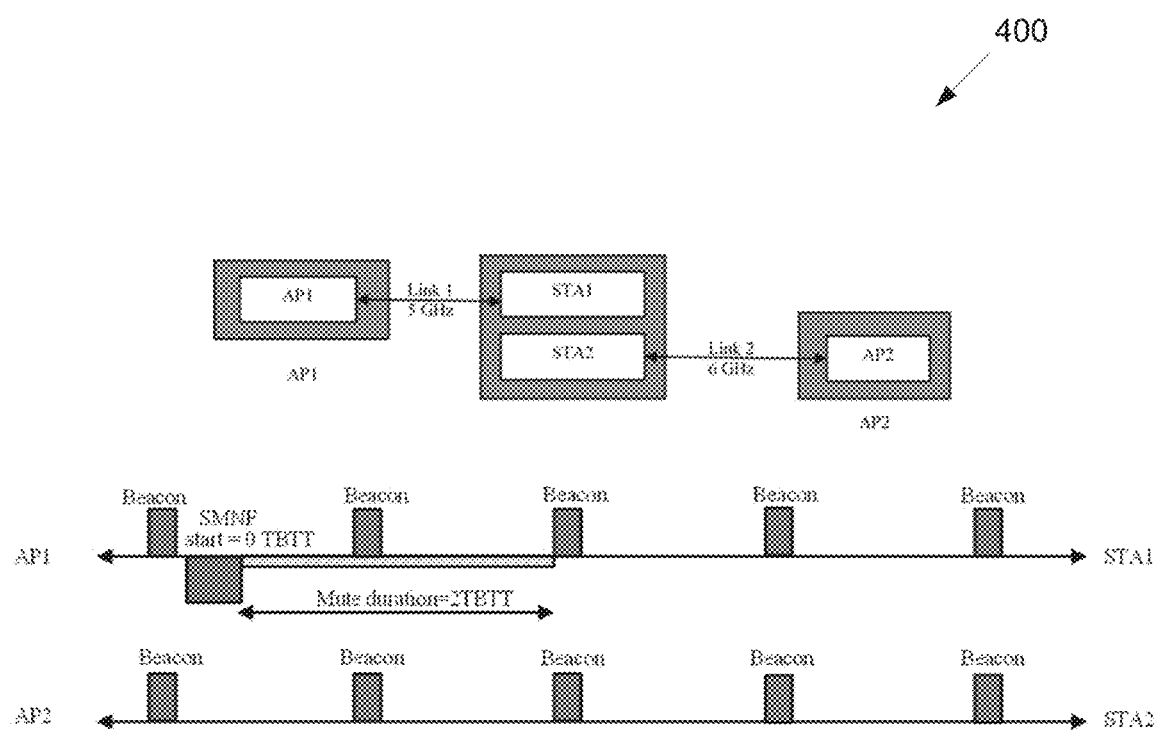
FIG. 4 illustrates an example of an individually addressed Service Muting Notification Frame according to various embodiments of this disclosure.

FIG. 4 illustrates an example of an individually addressed Service Muting Notification Frame 400 according to various embodiments of this disclosure. The embodiment of the individually addressed Service Muting Notification Frame 400 in FIG. 4 is for illustration only. Other embodiments of the individually addressed Service Muting Notification Frame 400 could be used without departing from the scope of this disclosure.

An illustration of such a Service Muting Notification frame being transmitted by an STA to its associated AP is shown in FIG. 4. In this illustration, both the mute start time field and the mute duration values are measured in TBTT and the corresponding values are depicted in the figure. Note that if Beacons cannot be decoded from one of the APs due to NSTR condition, start time and duration can be set in time units (TUs). Using the sub-fields of a received Service Muting Notification frame, the receiving AP may comply to muting notification sent by the STA. If the AP determines to comply with the SMNF, it shall not transmit any downlink packets to the STA nor shall it send individually addressed triggers to the STA for uplink transmission, for the duration of the muting. If the AP determines to not comply with the SMNF, it can transmit a disassociation frame to the STA. Such a determination can be based on, for example, the cumulative duration of the service mute requested by the STA being larger than a threshold, the AP not supporting service muting operation, etc.

Several concrete example embodiments for the implementation of the aforementioned Service Muting Notification frame in compliance with the WiFi 802.11be D1.01 draft [2] are provided below. In one embodiment, the Service Muting Notification Frame can be of the EHT protected action frame category with action field value of 6 as indicated in table 1.

TABLE 1

Proposed protected EHT Action field values

| Value | Meaning | Time priority |
|---|---|---|
| 0 | TID-To-Link Mapping Request | No |
| 1 | TID-To-Link Mapping Response | No |
| 2 | TID-To-Link Mapping Teardown | No |
| 3 | NSEP Priority Access Enable Request | No |
| 4 | NSEP Priority Access Enable Response | No |
| 5 | NSEP Priority Access Teardown | No |
| 6 | Service Muting Notification Frame | No |
| 7-255 | Reserved | |

In one embodiment showing the format of the Service Muting Notification Frame, the link muting duration is known deterministically and is transmitted on a link on which the muting is scheduled. Such a frame format is illustrated in Table 2 below. In this example, the muting may be applicable for only downlink or both downlink and uplink directions and also applicable to all TIDs and ACs. Thus, this example embodiment can be interpreted as an individually addressed quiet element request. In order to re-initiate communication on the link, the STA may first transmit an updated Service Muting Notification Frame with same SMNF identifier and duration set to 0 to unmute the link first.

TABLE 2

Embodiment 1 of Service Muting Notification Frame format

| Order | Information | Size |
|---|---|---|
| 1 | Category | 1 octet |
| 2 | Protected EHT Action | 1 octet |
| 3 | SMNF identifier | 1 octet |
| 4 | Start time subfield | 1 or 2 octets |
| 5 | Duration subfield | 1 or 2 octets |
| 6 | Link Muting Periodicity subfield | 1 or 2 octets |

In another embodiment, the SMNF identifier, start time and muting periodicity fields may be absent. In this embodiment, the muting is assumed to start immediately upon receipt of the SMNF. In addition, the AP may only maintain one concurrently active muting schedule for each STA. Any new SMNF received shall update an existing muting schedule (if applicable) or shall start a new muting schedule if none exists. This embodiment is illustrated in Table 3.

TABLE 3

Embodiment 2 of Service Muting Notification Frame format

| Order | Information | Size |
|---|---|---|
| 1 | Category | 1 octet |
| 2 | Protected EHT Action | 1 octet |
| 3 | Duration subfield | 1 or 2 octets |

In yet another embodiment more fields can be added to SMNF to enable coordination on the other links. The added fields may include
1—Suggested Channel field: this is used to notify the AP with the channels that it can switch to, to enable transmission on both links from both APs without NSTR limitation, as interference will be mitigated between both links.
2—PS Parameters of Muted Link field: this is used to inform muted AP with the power saving parameters of the operating link so that AP tries to avoid wake-up times of the operating link to operate the muted link with non-overlapping wake-up times Example embodiments of how the non-AP MBD can utilize the SMNF to perform coordinated orthogonal transmission across both links reliably in case of scenario2, i.e., the MBD is already associated with AP1 on link1 and AP2 on link2, where AP1 and AP2 are not part of the same MLD and link1 and link2 currently form an NSTR pair are described below.

Figure 5:
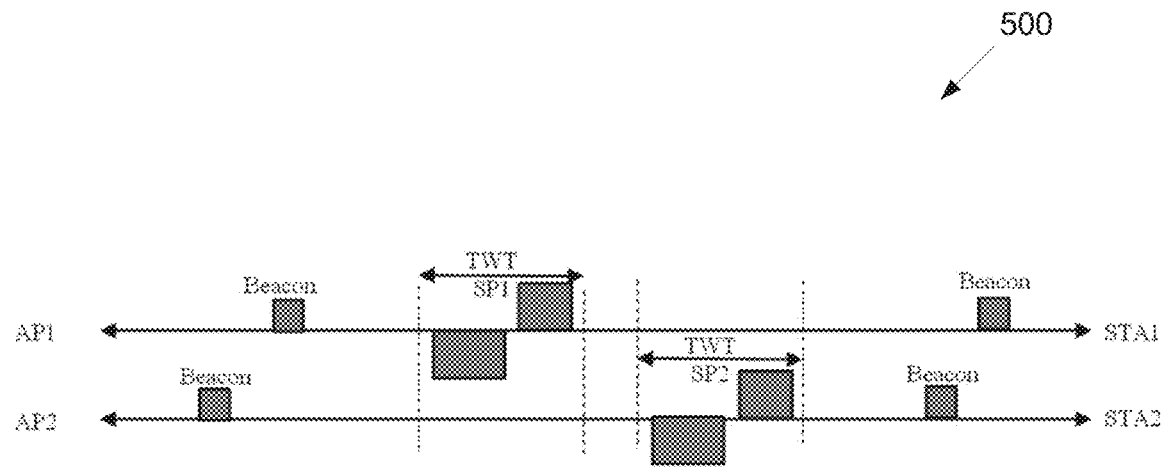
FIG. 5 illustrates an example of an orthogonal TWT service period negotiation for multi-AP operation according to various embodiments of this disclosure.

FIG. 5 illustrates an example of an orthogonal TWT service period negotiation for multi-AP operation 500 according to various embodiments of this disclosure. The embodiment of the orthogonal TWT service period negotiation for multi-AP operation 500 in FIG. 5 is for illustration only. Other embodiments of the orthogonal TWT service period negotiation for multi-AP operation 500 could be used without departing from the scope of this disclosure.

In one embodiment, a non-AP MBD upon detection of an NSTR condition on a link pair, shall transmit a service muting notification from STA1 to AP1. AP1 may either comply with the muting or may transmit a disassociation frame to STA1. In one embodiment, if STA1 receives a disassociation frame from AP1, the MBD shall tear down the association with AP1 and continue communication with AP2 unhindered on link2. If a disassociation frame is not received at STA1 from AP1, then STA2 of the MBD may negotiate an individual or broadcast target wake time (TWT) with a certain service period SP2 with AP2 first. After a successful TWT negotiation with AP2, STA1 of the MBD may transmit another SMNF to AP1 to perform unmuting on link1. It may then perform a TWT servicer period negotiation with AP1 such that the service period SP1 is non-overlapping with SP2 that is operational on link2. If any of above negotiation steps fail, the MBD may send disassociation frame from STA1 to AP1. In another embodiment, after negotiating a TWT period with AP2 on link2, and before unmuting link1 with AP1, STA2 may send an SMNF on link2 to mute transmission of link2 temporarily. This is to ensure reliable communication during negotiation of the TWT service period on link1. After both links have established non-overlapping service periods, an unmuting SMNF may be transmitted from STA2 to AP2 on link2. These embodiments of multi-AP association with orthogonal service periods is illustrated in FIG. 5.

Figure 6:
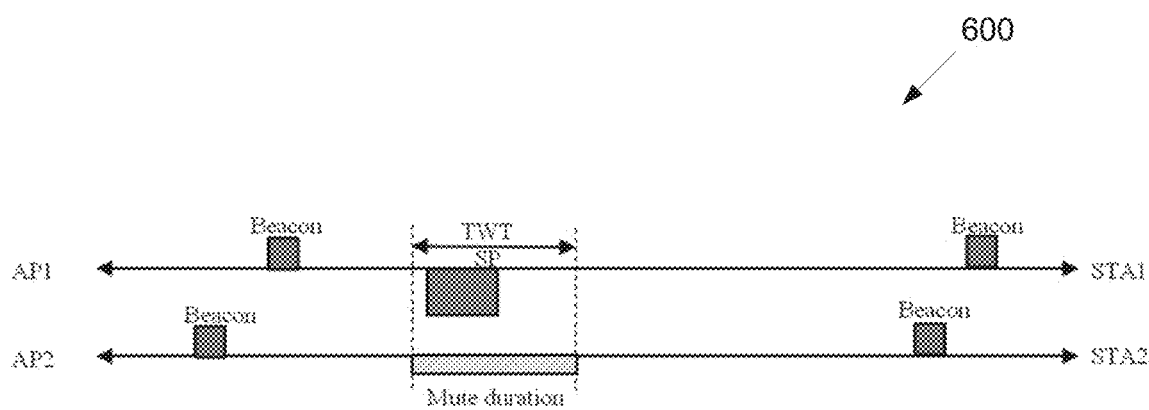
FIG. 6 illustrates an example of an aligned TWT service period and service-muting negotiation for multi-AP operation according to various embodiments of this disclosure.

FIG. 6 illustrates an example of an aligned TWT service period and service-muting negotiation for multi-AP operation 600 according to various embodiments of this disclosure. The embodiment of the aligned TWT service period and service-muting negotiation for multi-AP operation 600 in FIG. 6 is for illustration only. Other embodiments of the aligned TWT service period and service-muting negotiation for multi-AP operation 600 could be used without departing from the scope of this disclosure.

In one embodiment, a non-AP MBD upon detection of an NSTR condition on a link pair, can transmit a service muting notification from STA1 to APL. If a disassociation frame is not received at STA1 from AP1, then STA2 of the MBD may negotiate an individual or broadcast target wake time (TWT) with a certain service period SP2 with AP2 first. After a successful TWT negotiation with AP2, STA1 of the MBD may transmit another SMNF to AP1 to perform unmuting on link1. It may then transmit a third SMNF from STA1 to AP1 to initiate a periodic service muting that is overlapping with SP2 on link2. Note that this can be accomplished using the Link muting periodicity subfield of the SMNF as defined above. After successful negotiation, communication resumes with AP2 on link2 by avoiding the muted periods. If any of above negotiation steps fail, the MBD may send disassociation frame from STA1 to AP1. Note that in case the periodic mute duration on link2 becomes misaligned with the SP on link1 over time due to differing beacon intervals, STA2 can send a new SMNF with same identifier field, to update the parameters of the Mute duration. An illustration of this embodiment is illustrated in FIG. 6.

In one embodiment, a non-AP MBD upon detection of an NSTR condition on a link pair, can transmit a service muting notification from STA1 to APL. If a disassociation frame is not received at STA1 from AP1, then STA2 of the MBD may try to negotiate a channel switch or change in operation bandwidth with AP2. Such a channel switch or change in bandwidth can be to ensure that after the channel switch or bandwidth update, both links will no longer suffer an NSTR condition. If a channel switch or bandwidth update negotiation is successful between STA2 and AP2, STA1 of the MBD may transmit another SMNF to AP1 to perform unmuting on link1. Communication may then resume on both links normally. If a channel switch or bandwidth negotiation is unsuccessful, then the MBD may transmit a disassociation frame on either link1 to AP1 or on link2 to AP2. In another embodiment, if a channel switch or bandwidth negotiation is unsuccessful with AP2, then as an additional attempt, STA2 may transmit an SMNF to AP2 to mute transmission and then attempt to negotiate a channel switch or bandwidth update with AP1 on link1 to remove NSTR condition. Upon failure, the MBD may transmit a disassociation frame on either link1 to AP1 or on link2 to AP2.

IEEE 802.11be defines a new entity called multi-link device (MLD). Multi-link operation has two variations. The first type is simultaneous transmit/receive (STR) and the second is non-simultaneous transmit/receive (NSTR). An STA that is affiliated with an MLD with STR capability can transmit (or receive) a frame irrespective of the activity occurring on any of the other links of the MLD. However, if a pair of links formed by STAs affiliated with an MLD are NSTR link pairs, then the transmission on one of the link pair can result in signal leakage to the other. This causes two main problems. Firstly, if the other link is in reception mode, the signal leakiness can result in an interference to its ongoing reception. Secondly, if the STA affiliated with the MLD on the other link has a packet to transmit, it could potentially sense the link as being busy (due to the interference) even if the link is idle at that time.

To overcome the problems arising from the signal leakage, the transmission start times and end times on a NSTR link pair are aligned. In the same manner, the reception start times and end times are also aligned to avoid interference from the transmission of the control frame (e.g., Block Ack) that follows the DATA reception.

Figure 7:
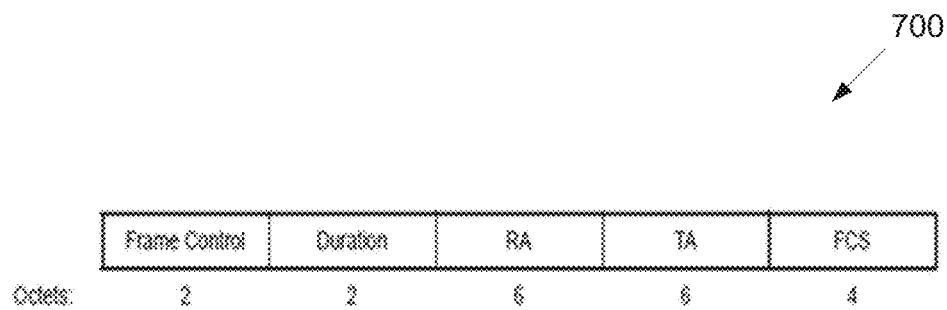
FIG. 7 illustrates an example of a frame format for the RTS frame according to various embodiments of this disclosure.

FIG. 7 illustrates an example of a frame format for the RTS frame 700 according to various embodiments of this disclosure. The embodiment of the frame format for the RTS frame 700 in FIG. 7 is for illustration only. Other embodiments of the frame format for the RTS frame 700 could be used without departing from the scope of this disclosure.

RTS/CTS is an 802.11 protocol to reduce frame collisions especially in a hidden terminal scenario. As a part of the procedure, a device with data to send, upon completing its backoff procedure, first transmits an RTS frame. The RTS frame has a format as shown in FIG. 7. As depicted, the frame contains a duration field which indicates the duration for transmission of the CTS frame, the data or management frame, the ACK frame and any interframe spacings involved. Consequently, according to the standard, the transmitter sets this value to the duration of the data/management frame+duration of CTS frame+duration of ACK frame+3 SIFS frames.

Upon receiving the RTS frame, the receiver responds with a CTS frame which is transmitted SIFS duration following the end of the RTS frame. The CTS frame has a duration field just like the RTS frame. The receiver uses the value in the duration field of the received RTS frame and subtracts from it the time to transmit a CTS frame+one SIFS. The remainder value is used to set the duration field in the CTS frame which is transmitted in response to the RTS frame. After a SIFS duration following the end of the CTS frame transmission, the Data transmission begins which is followed by ACK transmissions (after a SIFS duration). RTS/CTS protocol enables to reduce collisions due to hidden terminal scenario as the devices either hear the RTS or the CTS which helps them to set their NAV timer. Consequently, the hidden terminals become aware of the transmission via either the RTS or the CTS frame.

If the channel on which the receiver operates is busy or the RTS frame is not received, the receiver does not respond with a CTS frame. If the CTS is not received by the transmitter following the RTS frame, the transmitter assumes a failed RTS frame and initiates a new backoff procedure with a doubled maximum contention window size to retransmit the RTS. If the number of RTS transmission attempts exceed the maximum retry limit set by the standard, then the corresponding data packet is dropped.

A CF-end frame signals the end of a contention free period. This frame can be used by the AP to terminate the acquired TXOP and initiate a contention period.

Figure 8:
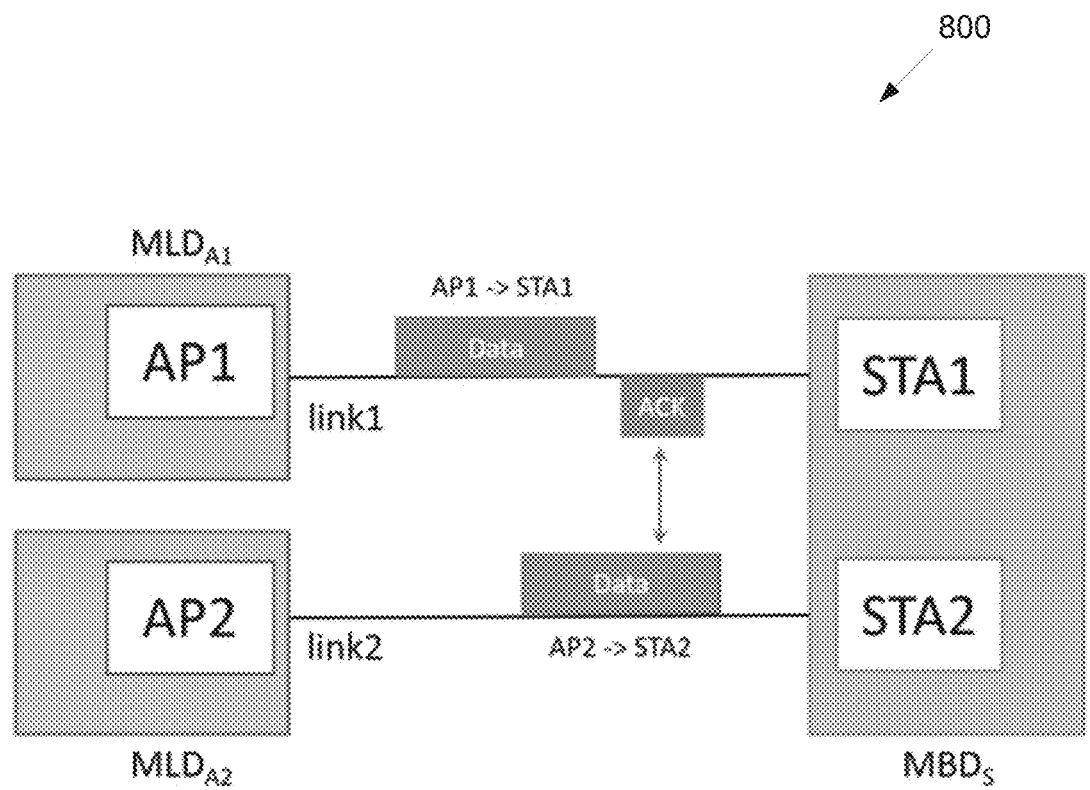
FIG. 8 illustrates an example depicting the multi-AP NSTR conflict scenario according to various embodiments of this disclosure.

FIG. 8 illustrates an example depicting the multi-AP NSTR conflict scenario 800 according to various embodiments of this disclosure. The embodiment of the multi-AP NSTR conflict scenario 800 in FIG. 8 is for illustration only. Other embodiments of the multi-AP NSTR conflict scenario 800 could be used without departing from the scope of this disclosure.

A non-AP WiFi device can be equipped with multiple stations (STAs) each capable of operating on a different frequency band simultaneously. In this disclosure, we shall refer to such a device as multi-band device (MBD). An example of such a MBD device is illustrated in FIG. 8. MBDs is a non-AP MBD and has two non-AP STAs which are STA1 and STA2 affiliated with it. Such a device can have two modes of operation. In mode 1, the device operates as a non-AP MLD (as defined in 802.11be [2]) and is connected to AP STAs affiliated with the same AP MLD. In mode 2, the device may connect to AP STAs that are not affiliated with the same AP MLD. In this disclosure, the focus is on operation in mode 2 where the STAs of the device are connected to distinct APs that are not co-located and do not form an AP MLD.

The problem is as illustrated in FIG. 8. As depicted in FIG. 8, MLDA1 and MLDA2 are two AP MLDs while MBDs is a non-AP MBD. AP1 is one of the AP STAs affiliated with MLDA1 while AP2 is one of the AP STAs affiliated with MLDA2. Further, STA1 and STA2 are two non-AP STAs affiliated with MBDs. Further, two links indicated by link1 and link2 in FIG. 8 have been setup as follows. The link indicated by link1 has been setup between STA1 and AP1 and the second link indicated by link2 has been setup between STA2 and AP2. STA1 and STA2 which operate over link1 and link2 respectively constitute an NSTR link pair. Further, we consider that this NSTR relationship can either be permanent or can dynamically change with time due to numerous reasons such as change in operation mode with respect to operating channel/frequency, change in the physical separation between the RF chains, etc.

Recall that to avoid the signal leakage based interference from one link to the other at STA1 and STA2, the start and end time of transmissions are synchronized. When the AP STAs with which STA1 and STA2 have established a link are co-located such type of synchronization can be achieved via in-device co-ordination between the two APs. However, when the two APs are not affiliated with the same device, a problem may arise under NSTR mode of operation. As shown in FIG. 8, due to a lack of co-ordination between AP1 and AP2 to align the start and end times of transmission, a conflict may arise when one of the links initiates a transmission while the other link is in reception mode. As depicted in the figure, AP1 has already started a data transmission with STA1. However, AP2 initiates a data transmission whose duration overlaps with the ACK transmission of STA1. Consequently, the data transmission from AP2 to STA2 encounters an interference due to NSTR constraints.

It is important to clarify that the problem is not limited to only downlink transmissions on both the links. In general, this problem may arise when the STA on one of the links goes into reception mode when the STA on the link constituting an NSTR link pair with the first STA is in transmission mode. Hence, this problem may also occur in a number of scenarios such as those involving peer to peer communication or association with EHT APs.

Therefore, there is a need for methods and frameworks that enable the devices to avoid any transmission/reception issues arising due to an NSTR conflict in a scenario involving association of co-located NSTR constrained STAs with non-co-located APs/STAs. Further, there is also a need for signaling methods to enable the STAs to inform the APs/STAs about the rise of such a conflict as the non-co-located APs/STAs may not be aware of the issue.

Some of the embodiments below are described in the context of FIG. 8 to aid the reader's understanding. However, they are not to be construed as limiting the scope of this invention in any manner. The same embodiments can also apply to other scenarios (e.g., those involving peer to peer communication).

Figure 9:
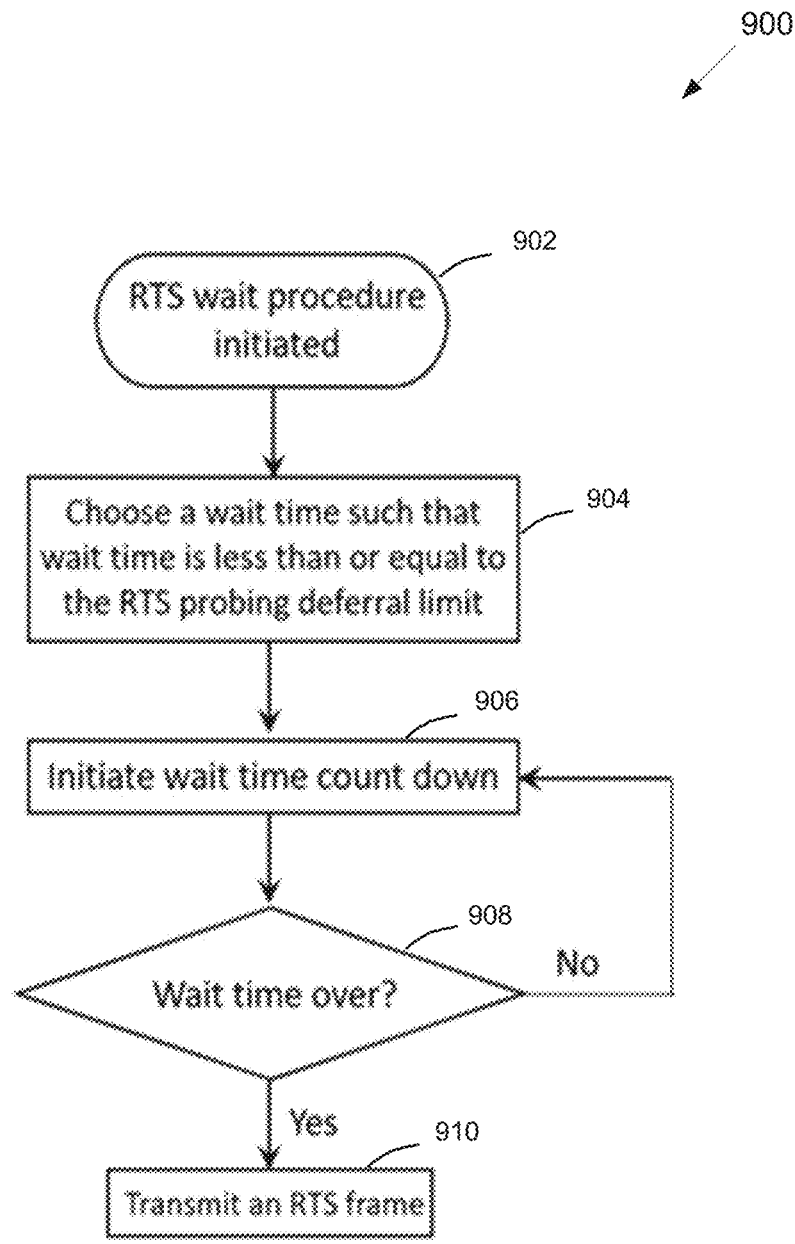
FIG. 9 illustrates a flow chart of an example RTS wait time procedure according to various embodiments of this disclosure.

FIG. 9 illustrates a flow chart of an example RTS wait time procedure 900 according to various embodiments of this disclosure. The embodiment of the RTS wait time procedure 900 in FIG. 9 is for illustration only. Other embodiments of the RTS wait time procedure 900 could be used without departing from the scope of this disclosure.

In one embodiment, each AP can use an RTS/CTS based probing procedure to check the status of other STAs affiliated with the non-AP MBD. According to this embodiment, AP2 can transmit an RTS frame on link2 to STA2 and use the RTS frame as a probe to check the status of STA1 affiliated with the same MBD as STA2. Upon receiving the RTS frame, STA2 not only considers its own link state but also that of other STAs affiliated with the same MBD as STA2 which constitute an NSTR link pair with STA2 (in this case the status of STA1 on link1). If one or more of the STAs constituting an NSTR link pair with STA2 are currently in transmission mode, STA2 does not respond with a CTS frame. If AP2 does not receive a CTS frame as expected, it initiates an RTS wait time procedure as depicted in FIG. 9. During the wait time, AP2 can perform any actions that can be completed within the wait time. The exact action(s) that AP2 performs is an implementation choice. For instance, AP2 can serve other STAs associated with it during this time. Alternatively, AP2 can also remain idle.

For example, at step 902, an RTS wait procedure is initiated. At step 904, a wait time is chosen such that wait time is less than or equal to the RTS probing deferral limit. At step 906, the wait time count down is initiated. At step 908, a determination is made whether the wait time is over. If the wait time is not over, flow reverts to step 906. If the wait time is over, then at step 910, an RTS frame is transmitted.

Figure 10:
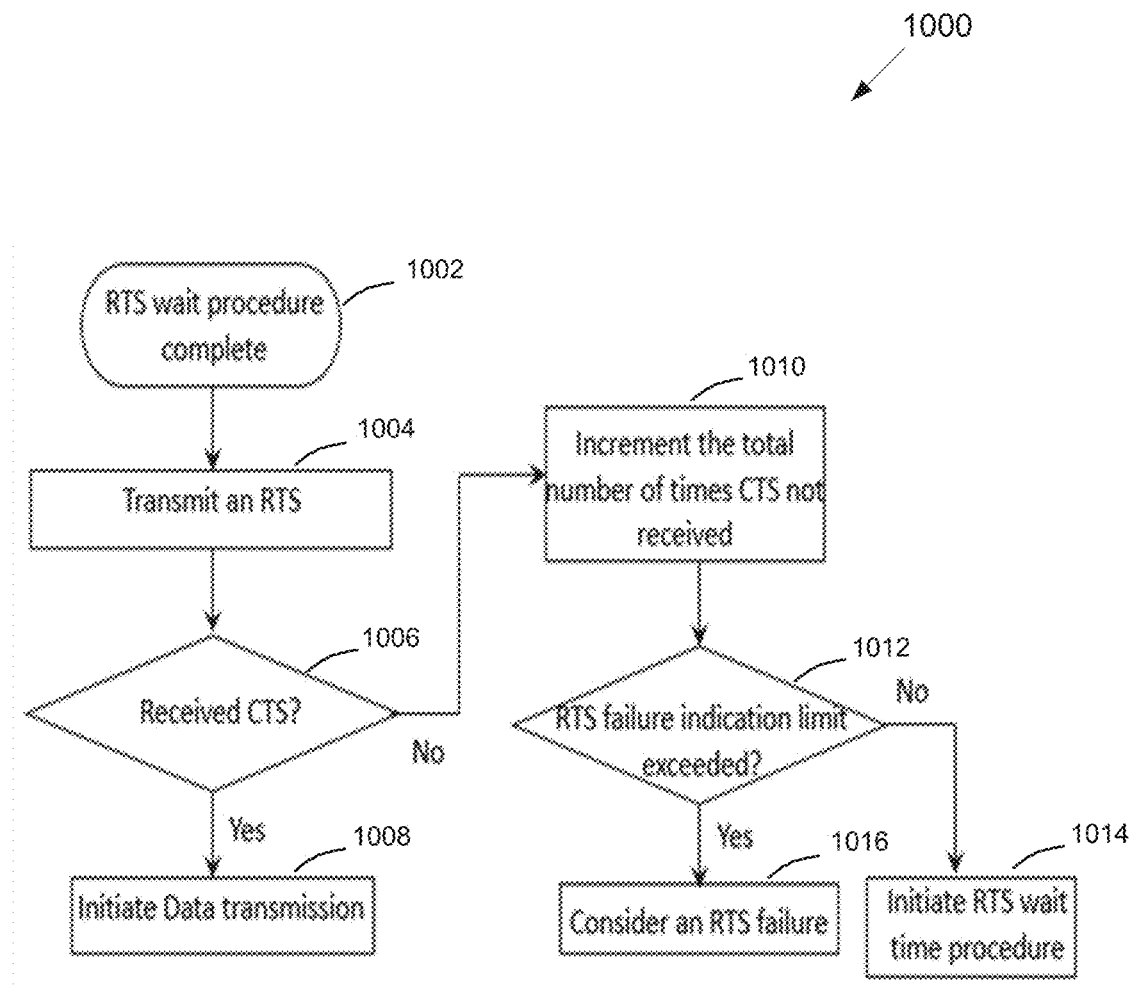
FIG. 10 illustrates a flow chart of an example procedure for handling non-reception of the RTS frame according to various embodiments of this disclosure.

FIG. 10 illustrates a flow chart of an example procedure for handling non-reception of the RTS frame 1000 according to various embodiments of this disclosure. The embodiment of the procedure for handling non-reception of the RTS frame 1000 in FIG. 10 is for illustration only. Other embodiments of the procedure for handling non-reception of the RTS frame 1000 could be used without departing from the scope of this disclosure.

As depicted in FIG. 10, the AP can also consider an RTS failure indication limit which is the consecutive number of times the RTS wait time procedure is initiated prior to attributing the non-reception of the CTS frame to an RTS failure and initiating a new backoff procedure. (The value of the RTS probing deferral limit and RTS failure indication limit can be determined based on the exchange of the multi-AP NSTR conflict information exchange frame format and procedure which is described in a later embodiment).

In one embodiment, upon non-reception of the CTS frame, to enable other devices on link2 to reset their NAV timers, AP2 can transmit a CF-end frame and release the channel. In another embodiment, to prevent the STAs on link2 from setting an unnecessarily large NAV timer, AP2 can set the duration in the RTS frame as being equal to an amount of time needed to cover the CTS frame plus an initial portion of the data transmission. The duration value will thus be equal to duration of 1 CTS frame+2 SIFS+minimum time to transmit 1 data frame. If STA2 decides to transmit a CTS frame, the duration of the CTS frame can be set to a large conservative value (e.g., aPPDUMaxTime). Consequently, when other STAs on link2 (not affiliated with MBDs) which can hear only the RTS will reset their NAV timer upon hearing the preamble of the data frame which contains the transmission duration. Further, the STAs on link2 which hear only the CTS will initially set their NAV timers to a high conservative value but later on upon hearing the ACK from STA2, will reset their NAV timers. In another embodiment, the duration field to set in the CTS frame can be explicitly determined based on the multi-AP NSTR conflict information exchange frame discussed in the embodiment below.

For example, after an RTS procedure is complete at step 1002 and the RTS frame is transmitted at step 1004, a determination is made at step 1006 whether a CTS is received. If the CTS is received, then at step 1008, data is transmitted. If the CTS is not received, then at step 1010, the total number of times that CTS is not received is incremented. At step 1012, a determination is made whether an RTS failure indication limit is reached. If the RTS failure indication limit is not exceeded, then at step 1014, an RTS wait time procedure is initiated. If the RTS failure indication limit is exceeded, then at step 1016, an RTS failure is considered.

In one embodiment, to indicate to the AP about the presence of multi-AP NSTR conflict, an STA may transmit a Multi-AP NSTR conflict information exchange frame. Such a frame may have one or more of the following fields:

TID Bitmap

RTS Probing deferral limit

RTS failure deferral limit

CTS duration value

Figure 11:
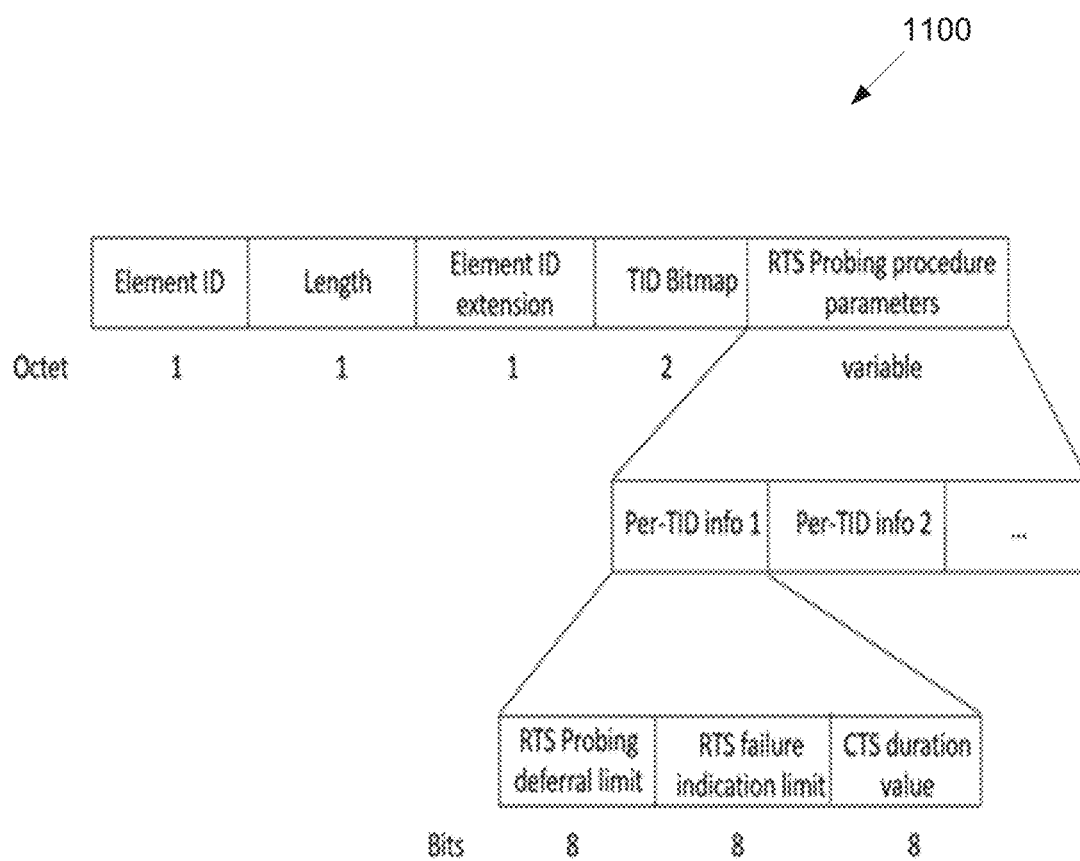
FIG. 11 illustrates an example Multi-AP NSTR conflict information exchange frame format to support the RTS/CTS based probing procedure according to various embodiments of this disclosure.

FIG. 11 illustrates an example Multi-AP NSTR conflict information exchange frame format 1100 to support the RTS/CTS based probing procedure according to various embodiments of this disclosure. The embodiment of the Multi-AP NSTR conflict information exchange frame format 1100 in FIG. 11 is for illustration only. Other embodiments of the Multi-AP NSTR conflict information exchange frame format 1100 could be used without departing from the scope of this disclosure.

The description of the fields of the multi-AP NSTR conflict information exchange frame is provided in Table 4. Reception of this frame provides an indication to the AP about the existence of a multi-AP NSTR conflict scenario. The frame can also contain information to enable the STA to customize the parameters involved in the RTS/CTS based probing procedure. An STA can transmit this frame to the AP with which it is associated to indicate the preferred set of parameters. Upon receiving the frame, the AP decides the final set of parameters based on the STA's recommendation and its own preference. The same frame can be used to inform the STA of the final set of parameters that the AP has decided. Therefore, the AP can transmit a multi-AP NSTR conflict information exchange frame to the STA containing the final set of parameters.

TABLE 4

Details of the fields and sub-fields in the multi-AP NSTR conflict information exchange frame format to support RTS/CTS based probing procedure

| Field | Meaning |
| --- | --- |
| TID bitmap | The TID(s) for which the values of the parameters mentioned below are indicated |
| RTS probing deferral limit | The maximum amount of duration between two probing attempts from the AP. The AP can set the number of STAs it serves between two consecutive RTS probing attempts such that the total duration between two consecutive attempts does not exceed this value. The STA can suggest this value to the AP by considering the latency requirement of the traffic for a given TID. |

TABLE 4-continued

Details of the fields and sub-fields in the multi-AP
NSTR conflict information exchange frame format
to support RTS/CTS based probing procedure

| Field | Meaning |
| --- | --- |
| RTS failure indication limit | The number of probing attempts after which the AP can consider an RTS transmission failure |
| CTS duration value | The value to set in the duration field in the CTS frame |

Note that the above RTS/CTS based probing procedure can be configured to also work as a legacy RTS/CTS procedure by assigning appropriate values to the RTS probing deferral limit and RTS failure indication limit. Specifically, by assigning a value of 0 to both the RTS probing deferral limit and the RTS failure indication limit, the RTS/CTS probing procedure would reduce to a legacy RTS/CTS procedure.

Further, the key advantage of the above method is that it does not require any modifications to a legacy STA's behavior as far as decoding the RTS probe is concerned. The legacy STAs will decode the RTS probes in the same manner in which they would decode a normal RTS frame. Further, the response of a legacy STA to the RTS probe remains exactly the same as a normal RTS frame.

Figure 12:
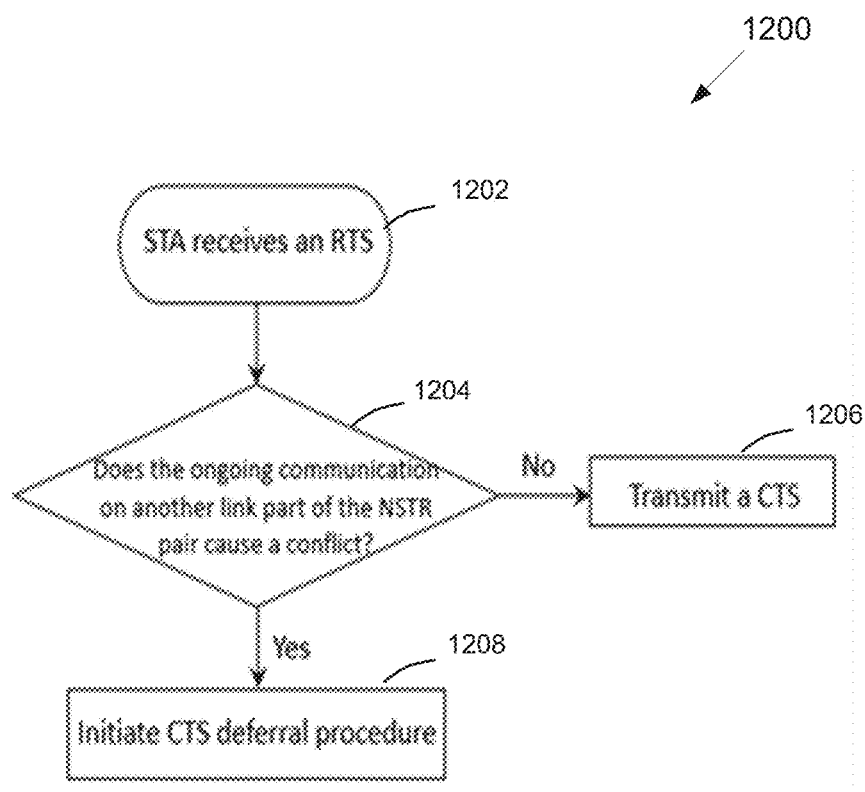
FIG. 12 illustrates a flow chart of an example CTS response procedure according to various embodiments of this disclosure.

FIG. 12 illustrates a flow chart of an example CTS response procedure 1200 according to various embodiments of this disclosure. The embodiment of the CTS response procedure 1200 in FIG. 12 is for illustration only. Other embodiments of the CTS response procedure 1200 could be used without departing from the scope of this disclosure.

In another embodiment, STA2 can follow a CTS response procedure as shown in FIG. 12. According to this embodiment, upon receiving an RTS frame from AP2, STA2 can check the status of STA1 on link1. If the activity of STA1 on link1 does not cause any conflicts to the transmission of AP2 on link2, then STA2 can respond with a CTS frame. However, if the ongoing communication between STA1 and AP1 can cause a conflict with the transmission of AP2 to STA2, then STA2 can follow a CTS deferral procedure.

For example, at step 1202, the STA receives an RTS. At step 1204, a determination is made whether ongoing communication on another link part of the NSTR pair causes a conflict. If the ongoing communication on another link part of the NSTR pair does not cause a conflict, then at step 1206, a CTS is transmitted If the ongoing communication on another link part of the NSTR pair causes a conflict, then at step 1208, a CTS deferral procedure is initiated.

Figure 13:
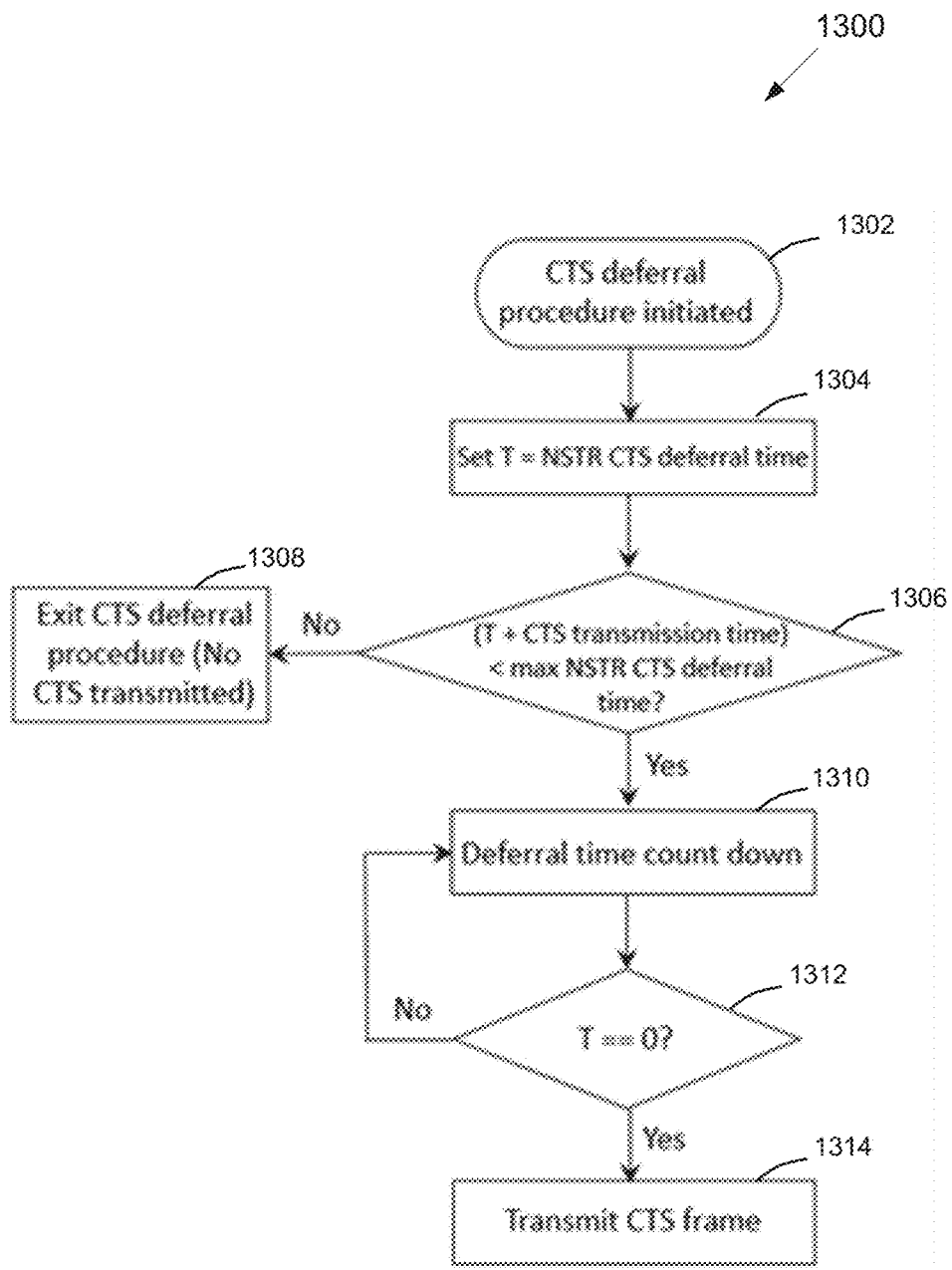
FIG. 13 illustrates a flow chart of an example CTS deferral procedure according to various embodiments of this disclosure.

FIG. 13 illustrates a flow chart of an example CTS deferral procedure 1300 according to various embodiments of this disclosure. The embodiment of the CTS deferral procedure 1300 in FIG. 13 is for illustration only. Other embodiments of the CTS deferral procedure 1300 could be used without departing from the scope of this disclosure.

As shown in FIG. 13, STA2 computes an NSTR CTS deferral time which is equal to the amount of time after which the communication between AP1 and STA1 does not cause a conflict with the transmission of AP2 to STA2 on link2. Further, STA2 also maintains a max NSTR CTS deferral time (This max NSTR CTS deferral time value is also exchanged with AP2 using a multi-AP NSTR conflict information exchange frame as explained below with regard to FIG. 14). If the NSTR CTS deferral time plus the time to transmit the CTS frame is less than the max NSTR CTS deferral time value, then STA2 transmits the CTS after the NSTR CTS deferral time is complete. However, if the NSTR CTS deferral time+the time to transmit the CTS frame is greater than the max NSTR CTS deferral time value, then STA2 does not transmit a CTS in response to the RTS frame from AP2.

Further, according to this embodiment, AP2 can wait for an amount of time that is equal to the max NSTR CTS deferral time value prior to declaring a failed RTS frame and initiating a new backoff procedure.

For example, after the CTS deferral procedure is initiated at step 1302, a timer T is set to equal the NSTR CTS deferral time (T=NSTR CTS deferral time) at step 1304. At step 1306, a determination is made whether T+CTS Transmission time<max NSTR CTS deferral time. If T+CTS Transmission time is less than max NSTR CTS deferral time, then at step 1308, the CTS deferral procedure is exited. If T+CTS Transmission time is not less than max NSTR CTS deferral time, then at step 1310, the deferral time is counted down. At step 1312, a determination is made whether T=0. If T≠0, then flow reverts to step 1310. If T=0, then at step 1314, the CTS frame is transmitted.

Figure 14:
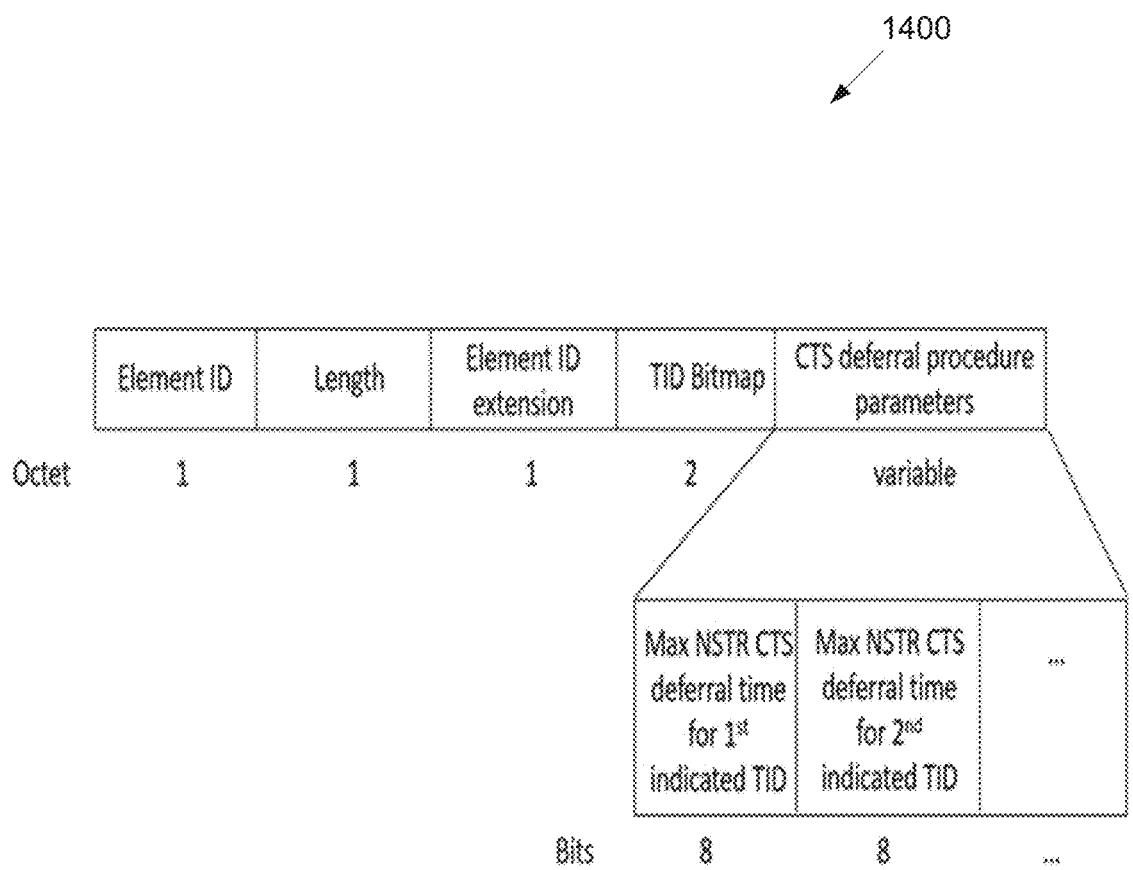
FIG. 14 illustrates an example Multi-AP NSTR conflict information exchange frame format to support the CTS deferral procedure according to various embodiments of this disclosure.

FIG. 14 illustrates an example Multi-AP NSTR conflict information exchange frame format 1400 to support the CTS deferral procedure according to various embodiments of this disclosure. The embodiment of the Multi-AP NSTR conflict information exchange frame format 1400 in FIG. 14 is for illustration only. Other embodiments of the Multi-AP NSTR conflict information exchange frame format 1400 could be used without departing from the scope of this disclosure.

In one embodiment, to indicate to the AP about the preferred value of the max NSTR CTS deferral time, an STA can leverage a Multi-AP NSTR conflict information exchange frame as shown in FIG. 14.

The description of the fields of the multi-AP NSTR conflict information exchange frame is provided in Table 5 below. The AP's response procedure to the multi-AP NSTR conflict information exchange frame is the same as described for the RTS/CTS based probing procedure embodiment.

TABLE 5

Details of the fields and sub-fields in the multi-AP NSTR conflict
information exchange frame format to support CTS deferral procedure

| Field | Meaning |
| --- | --- |
| TID bitmap | The TID(s) for which the remaining values are indicated |
| Max NSTR CTS deferral time | The maximum duration for which the AP waits to receive the CTS frame from the associated STA to which the RTS frame was transmitted. |

Note that the above CTS response procedure can be configured to also work as a legacy CTS response procedure by assigning appropriate values to the Max NSTR CTS deferral time. Specifically, by assigning a value of 0 to the Max NSTR CTS deferral time, the above CTS response procedure would reduce to a legacy CTS response procedure.

Further, one advantage of the above method is that it does not require any modifications to a legacy STA's behavior as far as decoding the RTS/CTS frame is concerned. The legacy STAs will decode the frames in the same manner in which they would decode normally decode them. Further, the response of the legacy STAs to either the RTS/CTS frames remains exactly the same as before and does not need any additional modifications.

Figure 15:
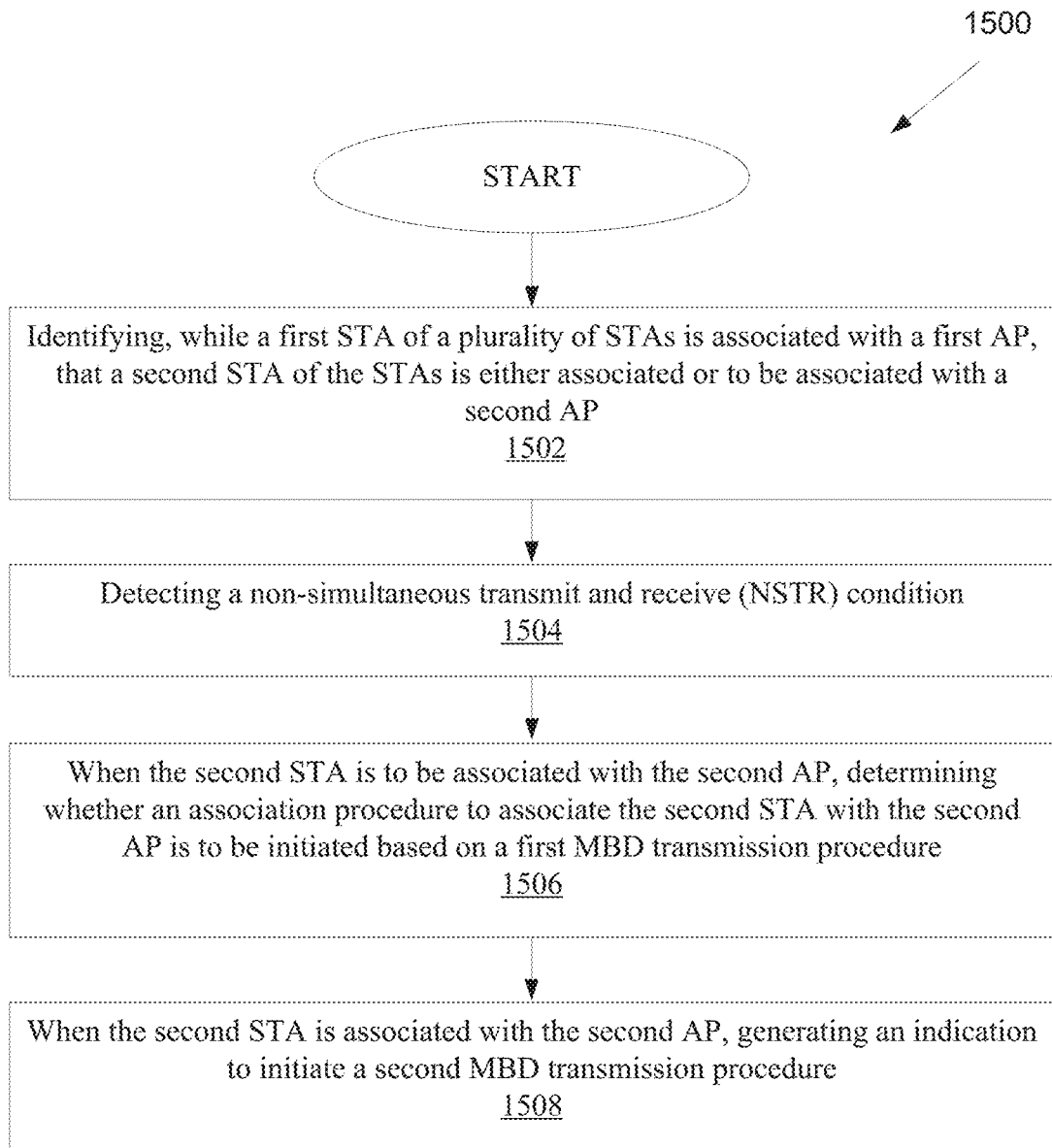
FIG. 15 illustrates a method of wireless communication performed by a non-AP MBD according to embodiments of the present disclosure.

FIG. 15 illustrates a flow chart of a method 1500 of wireless communication performed by a non-AP MBD, as may be performed by a STA such as STA 111, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the non-AP MBD identifies, while a first STA of a plurality of STAs is associated with a first AP, that a second STA of the STAs is either associated or to be associated with a second AP.

In step 1504, the non-AP MBD detects a non-simultaneous transmit and receive (NSTR) condition.

In step 1506, when the second STA is to be associated with the second AP, the non-AP MBD determines whether an association procedure to associate the second STA with the second AP is to be initiated based on a first MBD transmission procedure.

In step 1508, when the second STA is associated with the second AP, the non-AP MBD generates an indication to initiate a second MBD transmission procedure.

In one embodiment, the first MBD transmission procedure comprises a probe request, and to initiate the probe request, the non-AP MBD generates, on a first link with the first AP, an information element (IE) indicating unavailability of the first link, or indicates to enter an idle state on the first link with the first AP.

In one embodiment, when the association procedure is not to be initiated, the non-AP MBD generates an indication to not initiate the association procedure; and when the association procedure is to be initiated, the non-AP MBD generates, on a first link with the first AP, an information element (IE) indicating unavailability of the first link, or indicates to enter an idle state on the first link with the first AP; negotiates the second MBD transmission procedure to avoid the NSTR condition; and when the negotiation is unsuccessful, generates an indication to disassociate one of the first AP with the first STA or the second AP with the second STA.

In one embodiment, when the first STA is associated with the first AP and the second STA is associated with the second AP, the second MBD transmission procedure comprises an orthogonal target wake time (TWT) procedure, and to initiate the orthogonal TWT procedure, the non-AP MBD generates, on a second link with the second AP, a first information element (IE) indicating unavailability of the second link; negotiates a first TWT comprising a first service period (SP) with the first AP; generates, on a first link with the first AP, a second IE indicating unavailability of the first link; generates, on the second link with the second AP, a third IE indicating availability of the second link; and negotiates a second SP orthogonal to the first SP with the second AP, wherein the second SP avoids a beacon interval of the first AP, wherein when one or more of the generation of the first IE, the negotiation of the first TWT, the generation of the second IE, the generation of the third IE, or the negotiation of the second SP fails, the non-AP MBD generates an indication to disassociate the second AP with the second STA.

In one embodiment, when the first STA is associated with the first AP and the second STA is associated with the second AP, the second MBD transmission procedure comprises an aligned target wake time (TWT) and muting procedure, and to initiate the aligned TWT and muting procedure, the non-AP MBD generates, on a second link with the second AP, a first information element (IE) indicating unavailability of the second link; negotiates a first TWT comprising a first service period (SP) with the first AP; generates, on the second link with the second AP, a second IE indicating availability of the second link; and generates, on the second link with the second AP, a third IE indicating periodic unavailability of the second link having a duration that aligns with a duration of the first SP; wherein if one or more of the generation of the first IE, the negotiation of the first TWT, the generation of the second IE, or the generation of the third IE fails, the non-AP MBD generates an indication to disassociate the second AP with the second STA.

In one embodiment, when the first STA is associated with the first AP and the second STA is associated with the second AP, the second MBD transmission procedure comprises a channel switch procedure, and to initiate the channel switch procedure, the non-AP MBD generates, on a second link with the second AP, a first information element (IE) indicating unavailability of the second link or indicating the second STA to enter an idle state; generates, on a first link with the first AP, an indication indicating a channel switch request or a bandwidth update request to request the first AP to alleviate the NSTR condition; and generates, on the second link with the second AP, a second IE indicating availability of the second link, wherein if one or more of the generation of the first IE, the generation of the indication of the channel switch request or the bandwidth update request, or the generation of the second IE fails, the non-AP MBD generates an indication to disassociate the first AP with the first STA, or to disassociate the second AP with the second STA.

In one embodiment, when the first STA is associated with the first AP and the second STA is associated with the second AP, the second MBD transmission procedure comprises a request to send (RTS)/clear to send (CTS) procedure, and to initiate the RTS/CTS procedure, the non-AP MBD receives an RTS message on a second link from the second AP; determines whether ongoing communication on a first link by the first STA will cause the NSTR condition; when the ongoing communication on the first link by the first STA will cause the NSTR condition, generates an indication to initiate a CTS deferral procedure to defer a CTS procedure; and when the ongoing communication on the respective link by the first STA will not cause the NSTR condition, generates an indication indicating to the second AP to transmit on the second link.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-band device (MBD) comprising:
stations (STAs), each comprising a transceiver configured to form a link with a corresponding AP, wherein the corresponding APs are not part of a same AP multi-link device (MLD), and wherein respective links operate on different frequency bands; and
a processor operably coupled to the STAs, the processor configured to:
identify, while a first STA of the STAs is associated with a first AP of the corresponding APs, that a second STA of the STAs is either associated or to be associated with a second AP of the corresponding APs;
detect a non-simultaneous transmit and receive (NSTR) condition associated with the respective links;
based on the detected NSTR condition, when the second STA is to be associated with the second AP, determine whether an association procedure to associate the second STA with the second AP is to be initiated based on a first MBD transmission procedure, wherein the association procedure is initiated when the NSTR condition is avoided, and the association procedure is not initiated when the NSTR condition is not avoided;
based on the detected NSTR condition, when the second STA is associated with the second AP, generate an indication to initiate a second MBD transmission procedure;
when the association procedure is not to be initiated, generate an indication to not initiate the association procedure; and
when the association procedure is to be initiated, negotiate the second MBD transmission procedure to avoid the NSTR condition.

2. The non-AP MBD of claim 1, wherein the first MBD transmission procedure comprises a probe request, and to initiate the probe request, the processor is configured to generate, on a first link with the first AP, an information element (IE) indicating unavailability of the first link.

3. The non-AP MBD of claim 1, wherein the first MBD transmission procedure comprises a probe request, and to initiate the probe request, the processor is configured to generate, on a first link with the first AP, an indication indicating to enter an idle state on the first link with the first AP.

4. The non-AP MBD of claim 1, wherein the processor is further configured to:
when the association procedure is to be initiated, generate, on a first link with the first AP, an information element (IE) indicating unavailability of the first link; and
when the negotiation is unsuccessful, generate an indication to disassociate one of the first AP with the first STA or the second AP with the second STA.

5. The non-AP MBD of claim 1, wherein the processor is further configured to:
when the association procedure is to be initiated, generate, on a first link with the first AP, an indication indicating to enter an idle state on the first link with the first AP; and
when the negotiation is unsuccessful, generate an indication to disassociate one of the first AP with the first STA or the second AP with the second STA.

6. The non-AP MBD of claim 1, wherein when the first STA is associated with the first AP and the second STA is associated with the second AP, the second MBD transmission procedure comprises an orthogonal target wake time (TWT) procedure, and to initiate the orthogonal TWT procedure, the processor is configured to:
generate, on a second link with the second AP, a first information element (IE) indicating unavailability of the second link;
negotiate a first TWT comprising a first service period (SP) with the first AP;
generate, on a first link with the first AP, a second IE indicating unavailability of the first link;
generate, on the second link with the second AP, a third IE indicating availability of the second link; and
negotiate a second SP orthogonal to the first SP with the second AP, wherein the second SP avoids a beacon interval of the first AP,
wherein when one or more of the generation of the first IE, the negotiation of the first TWT, the generation of the second IE, the generation of the third IE, or the negotiation of the second SP fails, the processor is further configured to generate an indication to disassociate the second AP with the second STA.

7. The non-AP MBD of claim 1, wherein when the first STA is associated with the first AP and the second STA is associated with the second AP, the second MBD transmission procedure comprises an aligned target wake time (TWT) and muting procedure, and to initiate the aligned TWT and muting procedure, the processor is configured to:
generate, on a second link with the second AP, a first information element (IE) indicating unavailability of the second link;
negotiate a first TWT comprising a first service period (SP) with the first AP;
generate, on the second link with the second AP, a second IE indicating availability of the second link; and
generate, on the second link with the second AP, a third IE indicating periodic unavailability of the second link having a duration that aligns with a duration of the first SP;
wherein if one or more of the generation of the first IE, the negotiation of the first TWT, the generation of the second IE, or the generation of the third IE fails, the processor is further configured to generate an indication to disassociate the second AP with the second STA.

8. The non-AP MBD of claim 1, wherein when the first STA is associated with the first AP and the second STA is associated with the second AP, the second MBD transmission procedure comprises a channel switch procedure, and to initiate the channel switch procedure, the processor is configured to:
generate, on a second link with the second AP, a first information element (IE) indicating unavailability of the second link or indicating the second STA to enter an idle state;
generate, on a first link with the first AP, an indication indicating a channel switch request or a bandwidth update request to request the first AP to alleviate the NSTR condition; and
generate, on the second link with the second AP, a second IE indicating availability of the second link,
wherein if one or more of the generation of the first IE, the generation of the indication of the channel switch request or the bandwidth update request, or the generation of the second IE fails, the processor is further configured to generate an indication to disassociate the first AP with the first STA, or to disassociate the second AP with the second STA.

9. The non-AP MBD of claim 1, wherein when the first STA is associated with the first AP and the second STA is associated with the second AP, the second MBD transmission procedure comprises a request to send (RTS)/clear to send (CTS) procedure, and to initiate the RTS/CTS procedure, the processor is configured to:
  receive an RTS message on a second link from the second AP;
  determine whether ongoing communication on a first link by the first STA will cause the NSTR condition;
  when the ongoing communication on the first link by the first STA will cause the NSTR condition, generate an indication to initiate a CTS deferral procedure to defer a CTS procedure; and
  when the ongoing communication on the respective link by the first STA will not cause the NSTR condition, generate an indication indicating to the second AP to transmit on the second link.

10. A method for wireless communication performed by a non-access point (AP) multi-band device (MBD), wherein the non-AP MBD comprises wireless stations (STAs) configured to form links with corresponding APs, wherein the corresponding APs are not part of a same AP multi-link device (MLD), and wherein respective links operate on different frequency bands, the method comprising:
  identifying, while a first STA of the STAs is associated with a first AP of the corresponding APs, that a second STA of the STAs is either associated or to be associated with a second AP of the corresponding APs;
  detecting a non-simultaneous transmit and receive (NSTR) condition associated with the respective links;
  based on the detected NSTR condition, when the second STA is to be associated with the second AP, determining whether an association procedure to associate the second STA with the second AP is to be initiated based on a first MBD transmission procedure, wherein the association procedure is initiated when the NSTR condition is avoided, and the association procedure is not initiated when the NSTR condition is not avoided;
    based on the detected NSTR condition, when the second STA is associated with the second AP, generating an indication to initiate a second MBD transmission procedure;
    when the association procedure is not to be initiated, generating an indication to not initiate the association procedure; and
    when the association procedure is to be initiated, negotiating the second MBD transmission procedure to avoid the NSTR condition.

11. The method of claim 10, wherein the first MBD transmission procedure comprises a probe request, the probe request comprising:
  generating, on a first link with the first AP, an information element (IE) indicating unavailability of the first link, or indicating to enter an idle state on the first link with the first AP.

12. The method of claim 10, wherein the first MBD transmission procedure comprises a probe request, the probe request comprising:
  generating, on a first link with the first AP, an indication indicating to enter an idle state on the first link with the first AP.

13. The method of claim 10, further comprising:
  when the association procedure is to be initiated, generating, on a first link with the first AP, an information element (IE) indicating unavailability of the first link, or indicating to enter an idle state on the first link with the first AP; and
  when the negotiation is unsuccessful, generating an indication to disassociate one of the first AP with the first STA or the second AP with the second STA.

14. The method of claim 10, further comprising:
  when the association procedure is to be initiated, generating, on a first link with the first AP, an indication indicating to enter an idle state on the first link with the first AP; and
  when the negotiation is unsuccessful, generating an indication to disassociate one of the first AP with the first STA or the second AP with the second STA.

15. The method of claim 10, wherein when the first STA is associated with the first AP and the second STA is associated with the second AP, the second MBD transmission procedure comprises an orthogonal target wake time (TWT) procedure, the orthogonal TWT procedure comprising:
  generating, on a second link with the second AP, a first information element (IE) indicating unavailability of the second link;
  negotiating a first TWT comprising a first service period (SP) with the first AP;
  generating, on a first link with the first AP, a second IE indicating unavailability of the first link;
  generating, on the second link with the second AP, a third IE indicating availability of the second link; and
  negotiating a second SP orthogonal to the first SP with the second AP, wherein the second SP avoids a beacon interval of the first AP,
  wherein when one or more of the generating of the first IE, the negotiating of the first TWT, the generating of the second IE, the generating of the third IE, or the negotiating of the second SP fails, the method further comprises generating an indication to disassociate the second AP with the second STA.

16. The method of claim 10, wherein when the first STA is associated with the first AP and the second STA is associated with the second AP, the second MBD transmission procedure comprises an aligned target wake time (TWT) and muting procedure, the aligned TWT and muting procedure comprising:
  generating, on a second link with the second AP, a first information element (IE) indicating unavailability of the second link;
  negotiating a first TWT comprising a first service period (SP) with the first AP;
  generating, on the second link with the second AP, a second IE indicating availability of the second link; and
  generating, on the second link with the second AP, a third IE indicating periodic unavailability of the second link having a duration that aligns with a duration of the first SP;
  wherein if one or more of the generating of the first IE, the negotiating of the first TWT, the generating of the second IE, or the generating of the third IE fails, the method further comprises generating an indication to disassociate the second AP with the second STA.

17. The method of claim 10, wherein when the first STA is associated with the first AP and the second STA is associated with the second AP, the second MBD transmission procedure comprises a channel switch procedure, the channel switch procedure comprising:

generating, on a second link with the second AP, a first information element (IE) indicating unavailability of the second link or indicating the second STA to enter an idle state;

generating, on a first link with the first AP, an indication indicating a channel switch request or a bandwidth update request to request the first AP to alleviate the NSTR condition; and generating, on the second link with the second AP, a second IE indicating availability of the second link, wherein if one or more of the generating of the first IE, the generating of the indication of the channel switch request or the bandwidth update request, or the generating of the second IE fails, the method further comprises generating an indication to disassociate the first AP with the first STA, or to disassociate the second AP with the second STA.

18. The method of claim 10, wherein when the first STA is associated with the first AP and the second STA is associated with the second AP, the second MBD transmission procedure comprises a request to send (RTS)/clear to send (CTS) procedure, the RTS/CTS procedure comprising:

receiving an RTS message on a second link from the second AP;

determining whether ongoing communication on a first link by the first STA will cause the NSTR condition;

when the ongoing communication on the first link by the first STA will cause the NSTR condition, generating an indication to initiate a CTS deferral procedure to defer a CTS procedure; and when the ongoing communication on the respective link by the first STA will not cause the NSTR condition, generating an indication indicating to the second AP to transmit on the second link.

* * * * *